US012633950B2

(12) United States Patent
Kim

(10) Patent No.: US 12,633,950 B2
(45) Date of Patent: May 19, 2026

(54) COMMUNICATION CIRCUITRY FOR PREVENTING LOSS OF RECEIVED SIGNALS, AND ELECTRONIC DEVICE COMPRISING SAME

(71) Applicant: Samsung Electronics Co., Ltd., Suwon-si (KR)

(72) Inventor: Jonghyuk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 295 days.

(21) Appl. No.: 18/364,384

(22) Filed: Aug. 2, 2023

(65) Prior Publication Data

US 2023/0412200 A1 Dec. 21, 2023

Related U.S. Application Data

(63) Continuation of application No. PCT/KR2022/002165, filed on Feb. 14, 2022.

(30) Foreign Application Priority Data

Feb. 16, 2021 (KR) ........................ 10-2021-0020729

(51) Int. Cl.
*H04B 1/04* (2006.01)
*H04B 3/08* (2006.01)

(52) U.S. Cl.
CPC ............. *H04B 1/0458* (2013.01); *H04B 3/08* (2013.01); *H04B 2001/0416* (2013.01); *H04B 2001/0433* (2013.01)

(58) Field of Classification Search
CPC ........ H04B 1/0458; H04B 1/001; H04B 1/04; H04B 1/18; H04B 1/401; H04B 1/48
(Continued)

(56) References Cited

U.S. PATENT DOCUMENTS 8,111,188 B2 2/2012 Yanagisawa et al.
8,705,412 B2 4/2014 Yoon
(Continued)

FOREIGN PATENT DOCUMENTS

KR 20060009740 A 2/2006
KR 10-2014-0117648 A 10/2014
(Continued)

OTHER PUBLICATIONS

Korean Notice of Allowance dated Apr. 2, 2025 for KR Application No. 10-2021-0020729.
(Continued)

*Primary Examiner* — Andrea Lindgren Baltzell
*Assistant Examiner* — Victor Cole
(74) *Attorney, Agent, or Firm* — NIXON & VANDERHYE P.C.

(57) ABSTRACT

In communication circuitry and/or an electronic device including such communication circuitry, the communication circuitry may include: a transmission chain which outputs a transmission signal through an antenna; a reception chain which receives a receiving signal through the antenna; a transceiver electrically connected to the transmission chain and/or the reception chain; a coupler which transmits a portion of the transmission signal transmitted between the transmission chain and/or the reception chain and the antenna to the transceiver; and a switch electrically connected to the coupler, wherein the switch may connect the coupler to one circuit of a matching circuit for impedance matching of the coupler and an impedance of the coupler according to a time specified to output the transmission signal or a time specified to receive the reception signal and a mismatching circuit for mismatching of the coupler. Various other embodiments may be possible.

9 Claims, 11 Drawing Sheets

101

(58) Field of Classification Search
USPC .......................... 333/24; 343/860; 455/248.1
See application file for complete search history.

(56) References Cited

U.S. PATENT DOCUMENTS

| | | |
|---|---|---|
| 10,644,394 B2 | 5/2020 | Watkins |
| 2011/0189964 A1 | 8/2011 | Jeon et al. |
| 2013/0069737 A1 | 3/2013 | See et al. |
| 2013/0194054 A1 | 8/2013 | Presti |
| 2014/0232472 A1 | 8/2014 | Khilla et al. |
| 2015/0372656 A1 | 12/2015 | Mow et al. |
| 2016/0266185 A1 | 9/2016 | Solomko |
| 2017/0094608 A1* | 3/2017 | Langer ................. H04B 1/0057 |
| 2017/0358857 A1 | 12/2017 | Watkins |
| 2018/0048345 A1* | 2/2018 | Pehlke ...................... H03F 3/72 |
| 2018/0062672 A1 | 3/2018 | Kim |
| 2019/0115899 A1 | 4/2019 | Pajona et al. |
| 2020/0220242 A1 | 7/2020 | Kim et al. |

FOREIGN PATENT DOCUMENTS

| | | |
|---|---|---|
| KR | 101506658 B1 | 3/2015 |
| KR | 101573719 B1 | 12/2015 |
| KR | 20160019380 A | 2/2016 |
| KR | 20160147975 A | 12/2016 |
| KR | 20200040936 A | 4/2020 |
| KR | 102111390 B1 | 5/2020 |

OTHER PUBLICATIONS

International Search Report for PCT/KR2022/002165 mailed May 24, 2022, 3 pages.
Written Opinion of the ISA for PCT/KR2022/002165 mailed May 24, 2022, 3 pages.

* cited by examiner

COMMUNICATION CIRCUITRY FOR PREVENTING LOSS OF RECEIVED SIGNALS, AND ELECTRONIC DEVICE COMPRISING SAME

CROSS-REFERENCE TO RELATED APPLICATIONS

This application is a continuation of International Application No. PCT/KR2022/002165 filed on Feb. 14, 2022, designating the United States, in the Korean Intellectual Property Receiving Office, and claiming priority to KR Patent Application No. 10-2021-0020729 filed on Feb. 16, 2021, in the Korean Intellectual Property Office, the disclosures of all of which are hereby incorporated by reference herein in their entireties.

BACKGROUND

Field

Various example embodiments relate to communication circuits and/or electronic devices that prevent or reduce loss of received signals.

Description of Related Art

Various electronic devices such as a smartphone, a tablet PC, a portable multimedia player (PMP), a personal digital assistant (PDA), a laptop personal computer (laptop PC), or a wearable device are being distributed.

The electronic device may include a communication circuit for communication with an external electronic device. The communication circuit may include a transceiver performing modulation of a signal, and a path through which a transmission signal and/or a reception signal are transmitted. The communication circuit may further include a coupler capable of obtaining a part of the transmission signal to identify the characteristics of the transmission signal. The transceiver may control the operation of the transceiver based on a part of the transmission signal obtained through the coupler.

SUMMARY

In a communication circuit of an electronic device, a movement path of a reception signal and a movement path of a transmitted signal may be partly shared. A coupler may be installed in a part where the movement path of the transmitted signal and the movement path of the reception signal are shared. The coupler is a component implemented to obtain a part of the transmitted signal, but as the coupler is installed in the part where the movement path of the transmitted signal and the movement path of the reception signal are shared, the part of the reception signal may also be obtained. The part of the reception signal may be separated by the coupler, resulting in a loss of the reception signal, and the loss of the reception signal may cause a deterioration in communication quality.

The communication circuit and the electronic device including the communication circuit according to various example embodiments may prevent or reduce the chance of the coupler from obtaining the reception signal by performing impedance mismatching of the coupler while receiving the reception signal.

A communication circuit according to various example embodiments may include a transmission chain that outputs a transmission signal through an antenna; a reception chain that receives a reception signal through the antenna; a transceiver electrically connected, directly or indirectly, to the transmission chain and/or the reception chain; a coupler that transmits a part of the transmission signal transmitted between the transmission chain and/or the reception chain and the antenna to the transceiver; and a switch electrically connected, directly or indirectly, to the coupler, and the switch may connect the coupler to one circuit of a matching circuit for impedance matching of the coupler and a mismatching circuit for impedance mismatching of the coupler according to a time specified to output the transmission signal or a time specified to receive the reception signal.

A communication circuit according to various example embodiments may include a transmission chain that outputs a transmission signal of a first frequency band through an antenna; a reception chain that receives a reception signal of a second frequency band through the antenna; a transceiver electrically connected, directly or indirectly, to the transmission chain and/or the reception chain; a coupler that transmits a part of the transmission signal transmitted between the transmission chain and/or the reception chain and the antenna to the transceiver; and a switch electrically connected, directly or indirectly, to the coupler, and the switch may be configured to connect the coupler to one circuit of a matching circuit for impedance matching of the coupler and a mismatching circuit for impedance mismatching of the coupler according to transmitting the transmission signal or receiving the reception signal.

An electronic device according to various example embodiments may include a communication processor; a communication circuit electrically connected, directly or indirectly, to the communication processor, and a transmission chain that outputs a transmission signal through an antenna; a reception chain that receives a reception signal through the antenna; a transceiver electrically connected, directly or indirectly, to the transmission chain and/or the reception chain; a coupler that transmits a part of the transmission signal transmitted between the transmission chain and/or the reception chain and the antenna to the transceiver; and a switch electrically connected, directly or indirectly, to the coupler, and the communication processor may be configured to control the switch to connect the coupler to one circuit of a matching circuit for impedance matching of the coupler and a mismatching circuit for impedance mismatching of the coupler according to a time specified to output the transmission signal or a time specified to receive the reception signal.

A communication circuit and/or an electronic device including the communication circuit according to various example embodiments may control the communication circuit so that the coupler is connected, directly or indirectly, to the mismatching circuit for a specified time to receive the reception signal. Accordingly, the communication circuit and the electronic device according to various example embodiments may or reduce a chance of the reception signal from being separated through the coupler for a specified time to receive the reception signal, thereby improving reception performance of the electronic device.

A communication circuit and an electronic device including the communication circuit according to various example embodiments may control the communication circuit so that the coupler is connected, directly or indirectly, to the mismatching circuit after transmission of the transmission signal is completed. Accordingly, the communication circuit and the electronic device according to various example embodiments may prevent or reduce a chance of the reception signal from being separated through the coupler while the transmission signal is not being transmitted, thereby improving reception performance of the electronic device.

BRIEF DESCRIPTION OF DRAWINGS

The above and other aspects, features and advantages of certain embodiments of the present disclosure will be more apparent from the following detailed description, taken in conjunction with the accompanying drawings, in which:

FIG. 7 is a diagram illustrating an electronic device supporting frequency division duplex (FDD) according to various example embodiments.

FIG. 9 is a diagram illustrating an electronic device supporting time division duplex (TDD) and FDD communication according to various example embodiments.

DETAILED DESCRIPTION

Figure 1:
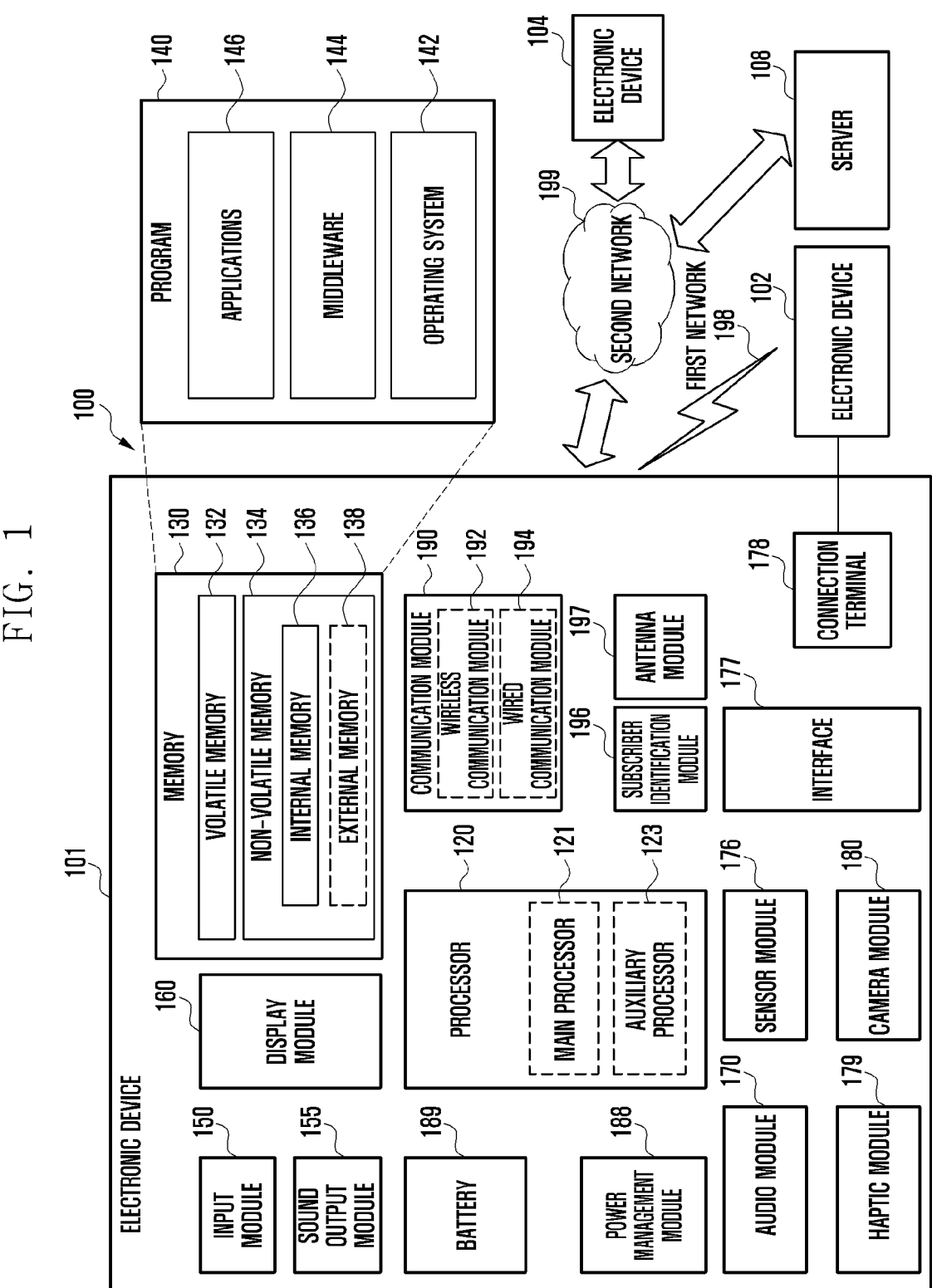
FIG. 1 is a block diagram of an electronic device according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
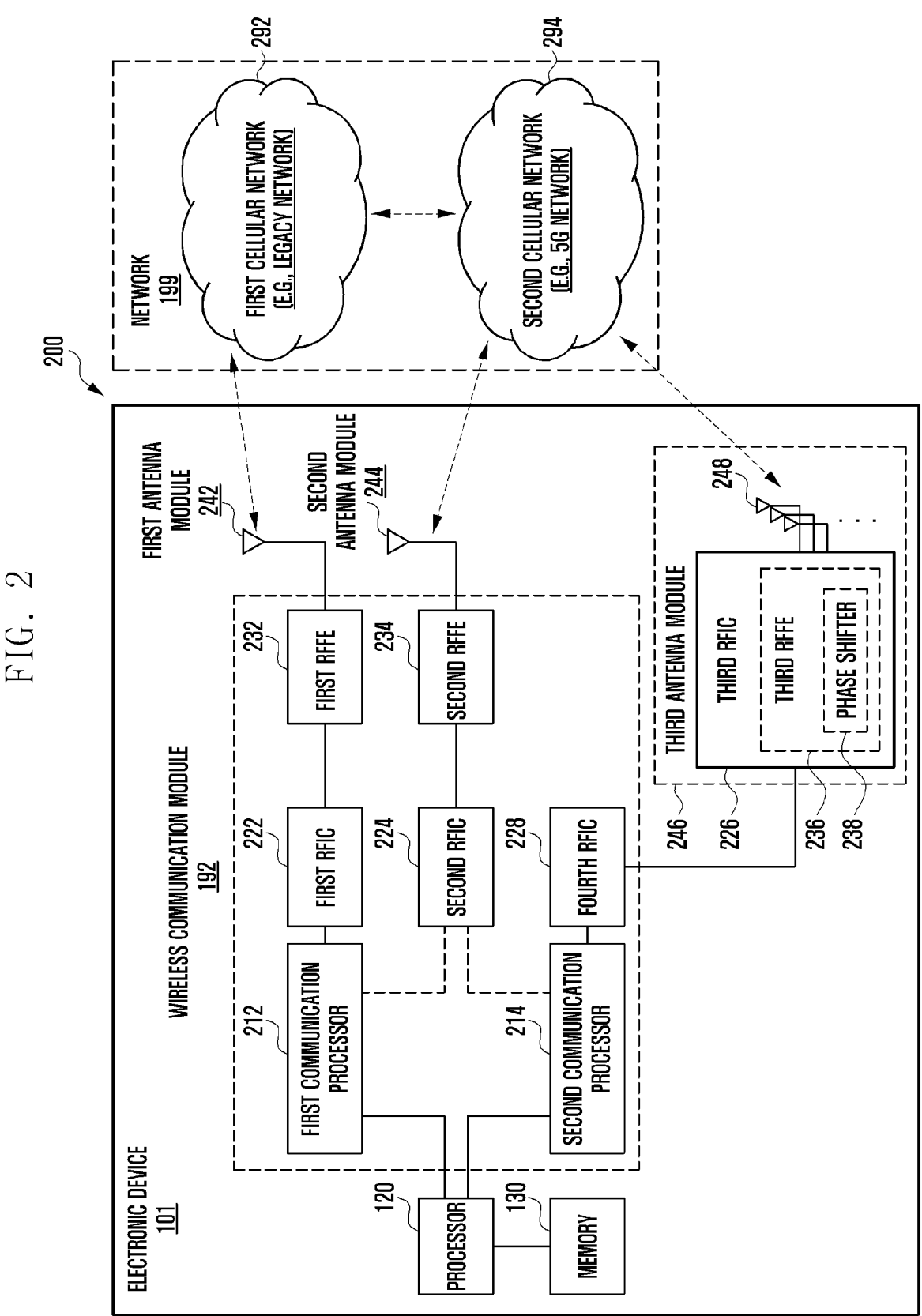
FIG. 2 is a block diagram of an electronic device for supporting legacy network communication and 5G network communication according to various example embodiments.

FIG. 2 is a block diagram 200 of an electronic device 101 for supporting legacy network communication and 5G network communication according to certain embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., a 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
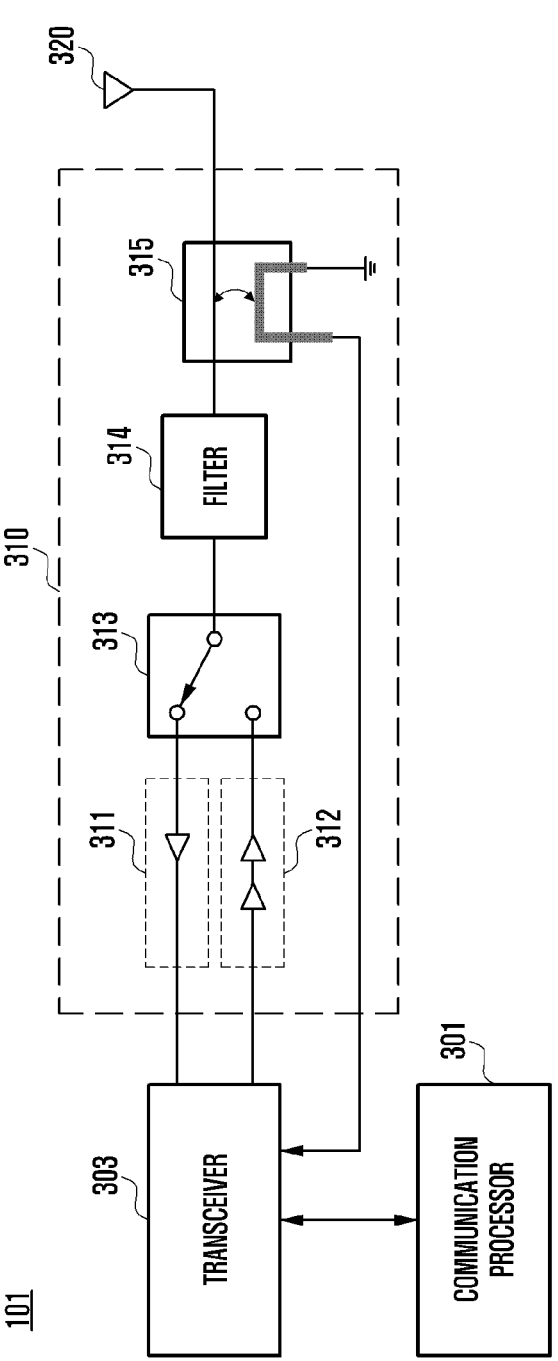
FIG. 3 is a block diagram of an electronic device according to various example embodiments.

FIG. 3 is a block diagram of an electronic device according to various example embodiments.

Referring to FIG. 3, an electronic device (e.g., the electronic device 101 of FIG. 1) according to various example embodiments may include a communication processor 301 (e.g., the first communication processor 212 of FIG. 2 or the second communication processor 214 of FIG. 2), a transceiver 303 (e.g., the first RFIC 222, the second RFIC 224, or the fourth RFIC 228 of FIG. 2), a communication circuit 310, and/or an antenna 320 (e.g., the first antenna module 242, the second antenna module 244, or the third antenna module 246 of FIG. 2).

According to various example embodiments, the communication processor 301 may receive or transmit control data or user data through short-range wireless communication (e.g., Wi-Fi or Bluetooth) or cellular wireless communication (e.g., 4th generation mobile communication or 5th generation mobile communication). The communication processor 301 may establish a cellular communication connection with a base station through control data, and transmit data received from an application processor (e.g., the processor 120 of FIG. 1) to the base station or transmit data received from the base station to the application processor 120 through the established cellular communication.

According to various example embodiments, the transceiver 303 may perform various operations for processing signals received from the communication processor 310. For example, the transceiver 303 may perform a modulation on a signal received from the communication processor 301. For example, the transceiver 303 may perform a frequency modulation to convert a baseband signal into a radio frequency (RF) signal used for cellular communication. The transceiver 303 may also perform demodulation on a signal received from the outside through the communication circuit 310. For example, the transceiver 303 may perform frequency demodulation to convert a radio frequency (RF) signal into a baseband signal.

According to various example embodiments, the communication circuit 310 may include a reception chain 311 that receives a signal radiated from the outside through the antenna 320 and/or a transmission chain 312 that outputs the signal transmitted by the transceiver 303 through the antenna 320. The reception chain 311 may include various components included in the movement path of the reception signal. For example, the reception chain 311 may include various components (e.g., amplifiers, switches, or filters) that amplify a reception signal received through the antenna 320 and filter the amplified signal. The transmission chain 312 may include various components included in the movement path of the transmitted signal. For example, the transmission chain 312 may include various components (e.g., amplifiers, switches, or filters) that amplify a signal transmitted by the transceiver 303 and filter the amplified signal.

According to various example embodiments, the communication circuit 310 may include a switch 313 capable of selectively connecting a filter 314 to one of the receive chain 311 and the transmit chain 312. The switch 313 may electrically connect the transmission chain 312 to the filter 314 based on the control of the communication processor 301 for a specified time to output a transmitted signal through the transmission chain 312. The switch 313 may electrically connect the reception chain 311 to the filter 314 based on the control of the communication processor 301 for a specified time to receive a reception signal through the reception chain 311.

According to various example embodiments, the communication circuit 310 may include the filter 314 for filtering a signal of a specified frequency band among signals transmitted through the receive chain 311 and/or the transmit chain 312.

According to various example embodiments, the communication circuit 310 may include a coupler 315 for obtaining a part of the transmission signal transmitted through the transmission chain 312. The coupler 315 may be connected, directly or indirectly, between the filter 314 and the antenna 320. The coupler 315 is coupled to the transmission path between the filter 314 and the antenna 320 to obtain a part of the signal transmitted through the transmission path between the filter 314 and the antenna 320. The part of the transmission signal obtained by the coupler 315 may be transmitted to the transceiver 303. The transceiver 303 may receive the part of the transmission signal transmitted by the coupler and monitor the part of the transmission signal to identify characteristics (e.g., quality and strength of the transmission signal) of the transmission signal.

According to various example embodiments, a transmission signal output through the antenna 320 and a reception signal received through the antenna 320 may be transmitted by using at least a part of the same section. According to an embodiment, the transmitted signal and/or the reception signal may move to the antenna 320 and/or the filter 314 through a transmission path implemented between the filter 314 and the antenna 320.

According to various example embodiments, the coupler 315 may be connected on a path shared by a transmission signal and/or a reception signal. When the coupler 315 is implemented on the path shared by the transmission signal and/or the reception signal, at least a part of the reception signal may be separated by the coupler 315. In the communication circuit 310, insertion loss (IL) of the reception signal may occur by the coupler 315. For example, a loss of a predetermined size (e.g., 0.2 dB to 0.3 dB) may occur in the reception signal by the coupler 315. The coupler 315 is an element implemented for monitoring a transmitted signal, and considering that it has nothing to do with a reception signal, the loss of the reception signal by the coupler 315 may deteriorate communication quality.

Hereinafter, a communication circuit capable of reducing a loss of a reception signal that may occur by the coupler 315 and an electronic device including the communication circuit will be described.

Figure 4:
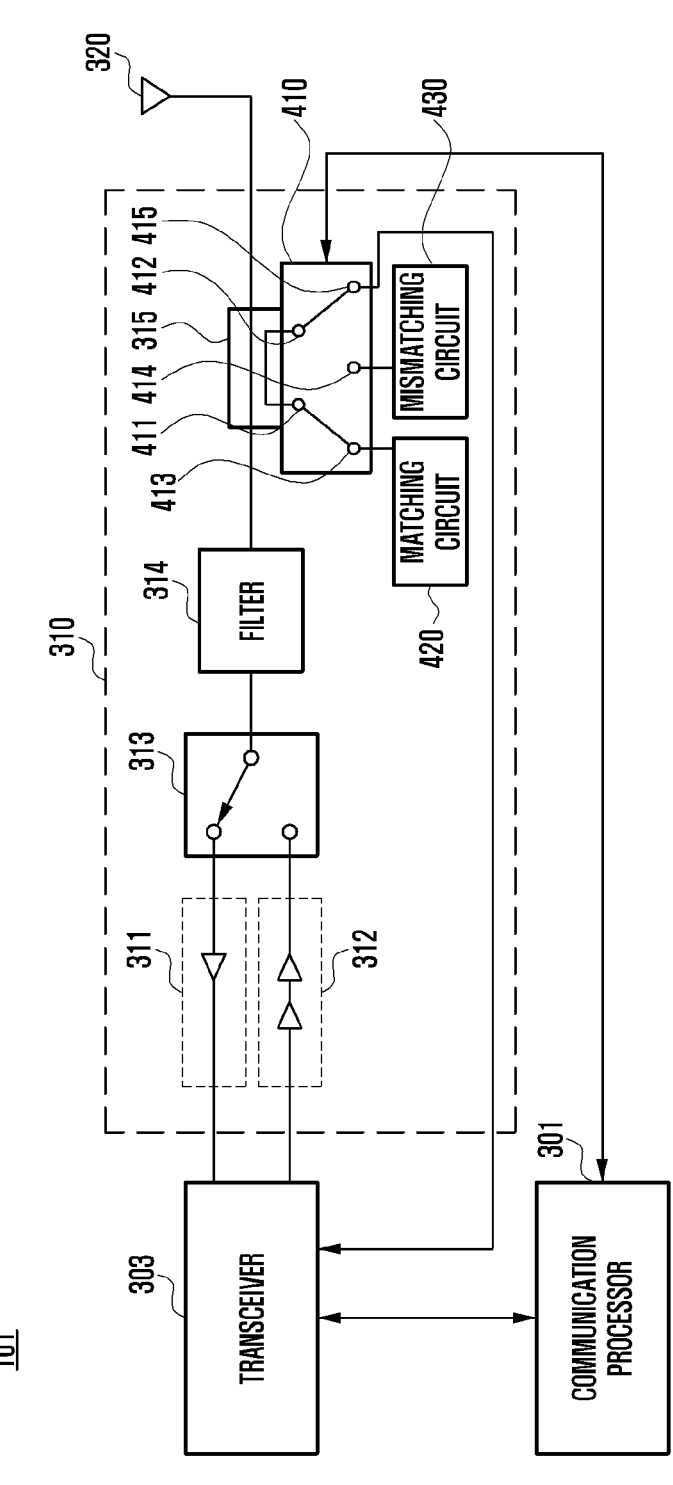
FIG. 4 is a block diagram of an electronic device according to various example embodiments.

FIG. 4 is a block diagram of an electronic device according to various example embodiments.

Referring to FIG. 4, an electronic device (e.g., the electronic device 101 of FIG. 1) according to various example embodiments may include a communication processor 301 (e.g., the first communication processor 212 of FIG. 2 or the second communication processor 214 of FIG. 2), a transceiver 303 (e.g., the first RFIC 222, the second RFIC 224, or the fourth RFIC 228 of FIG. 2), a communication circuit 310, and/or an antenna 320 (e.g., the first antenna module 242, the second antenna module 244, or the third antenna module 246 of FIG. 2).

According to various example embodiments, the communication processor 301 may receive or transmit control data or user data through short-range wireless communication (e.g., Wi-Fi or Bluetooth) or cellular wireless communication (e.g., 4th generation mobile communication or 5th generation mobile communication). The communication processor 301 may establish a cellular communication connection with a base station through control data, and transmit data received from an application processor (e.g., the processor 120 of FIG. 1) to the base station or transmit data received from the base station to the application processor 120 through the established cellular communication.

According to various example embodiments, the transceiver 303 may perform various operations for processing signals received from the communication processor 310. For example, the transceiver 303 may perform a modulation on a signal received from the communication processor 301. For example, the transceiver 303 may perform a frequency modulation to convert a baseband signal into a radio frequency (RF) signal used for cellular communication. The transceiver 303 may also perform demodulation on a signal received from the outside through the communication circuit 310. For example, the transceiver 303 may perform frequency demodulation to convert a radio frequency (RF) signal into a baseband signal.

According to various example embodiments, the communication circuit 310 may include a reception chain 311 that receives a signal radiated from the outside through the antenna 320 and/or a transmission chain 312 that outputs the signal transmitted by the transceiver 303 through the antenna 320. The reception chain 311 may include various components included in the movement path of the reception signal. For example, the reception chain 311 may include various components (e.g., amplifiers, switches, or filters) that amplify a reception signal received through the antenna 320 and filter the amplified signal. The transmission chain 312 may include various components included in the movement path of the transmitted signal. For example, the transmission chain 312 may include various components (e.g., amplifiers, switches, or filters) that amplify a signal transmitted by the transceiver 303 and filter the amplified signal.

According to various example embodiments, the communication circuit 310 may include a first switch 313 capable of selectively connecting a filter 314 to one of the receive chain 311 and the transmit chain 312. The first switch 313 may electrically connect the transmission chain 312 to the filter 314 based on the control of the communication processor 301 for a specified time to output a transmitted signal through the transmission chain 312. The first switch 313 may electrically connect the reception chain 311 to the filter 314 based on the control of the communication processor 301 for a specified time to receive a reception signal through the reception chain 311.

According to various example embodiments, the communication circuit 310 may include the filter 314 for filtering a signal of a specified frequency band among signals transmitted through the receive chain 311 and/or the transmit chain 312.

According to various example embodiments, the communication circuit 310 may include a coupler 315 for obtaining a part of the transmission signal transmitted through the transmission chain 312. The coupler 315 may be connected between at least the filter 314 and the antenna 320. The part of the transmission signal obtained by the coupler 315 may be transmitted to the transceiver 303. The transceiver 303 may receive the part of the transmission signal transmitted by the coupler and monitor the part of the transmission signal to identify characteristics (e.g., quality and strength of the transmission signal) of the transmission signal.

According to various example embodiments, the communication processor 301 may perform a series of operations to reduce or prevent loss of a reception signal by the coupler 315. According to an embodiment, the electronic device 101 may support a time division duplex (TDD) communication method. The TDD communication method may refer to a communication method in which an output time of a transmission signal and a reception time of a reception signal are separated. For example, the TDD communication method is a communication method in which output of a transmission signal and reception of a reception signal cannot be simultaneously performed, and may be a communication method in which a time specified for outputting a transmission signal and a time specified for receiving a reception signal are different from each other. When the electronic device 101 supports the TDD communication method, the communication processor 301 may receive information on a specified time to output the transmission signal and a specified time to receive the reception signal from a base station supporting cellular communication.

The communication processor 301 may electrically connect the coupler 315 to a matching circuit 420 for impedance matching of the coupler 315 for a specified time to output a transmission signal through the transmission chain 312. When the coupler 315 is electrically connected, directly or indirectly, to the matching circuit 420, the coupler 315 may obtain a part of a signal and transmit the obtained signal to the transceiver 303.

According to various example embodiments, impedance matching of the coupler 315 may refer to matching the impedance of the coupler 315 (e.g., impedance of the coupler 315 measured at the path implemented between the filter 314 and the antenna 320) and the impedance of a path (e.g., impedance of the path implemented between the filter 314 and the antenna 320 measured at the coupler 315) implemented between the filter 314 and the antenna 320. The matching circuit 420 may include an element having a specified impedance for impedance matching of the coupler 315. The specified impedance may have the same value (e.g., 50Ω) as an impedance value (e.g., 50Ω) of the path implemented between the filter 314 and the antenna 320 measured by the coupler 315.

The communication processor 301 may electrically connect a mismatching circuit 430 for impedance mismatching of the coupler 315 to the coupler 315 for a specified time to receive the reception signal through the receive chain 311.

According to various example embodiments, impedance mismatching may refer to increasing (or infinite impedance) or decreasing the impedance of the coupler 315 (e.g., impedance of the coupler 315 measured at the path implemented between the filter 314 and the antenna 320). Increasing (or infinity) or decreasing the impedance of the coupler 315 may reduce the magnitude of a signal separated by the coupler 315. The mismatching circuit 430 may be implemented in an open state or a short state in order to mismatch the impedance of the coupler 315. The mismatching circuit 430 may include an element having a specified impedance (e.g., a large resistance) for impedance mismatching of the coupler 315.

According to various example embodiments, the mismatching circuit 430 may be implemented as a filter (e.g., a low pass filter capable of passing signals of a frequency band lower than the frequency band of the reception signal, a high pass filter capable of passing signals of a frequency band higher than the frequency band of the reception signal, and/or a band reject filter that blocks signals of the frequency band of the reception signal) capable of blocking a frequency band of a reception signal.

According to various example embodiments, the communication circuit 310 may include a second switch 410 for connecting the matching circuit 420 and/or the mismatching circuit 430 to the coupler 315. The coupler 315 may be electrically connected, directly or indirectly, to the second switch 410. The switch 410 may perform a series of operations to reduce or prevent loss of a reception signal by the coupler 315 under the control of the communication processor 301.

According to various example embodiments, the second switch 410 may include a first terminal 411 connected to one side of the coupler 315, a second terminal 412 connected to the other side of the coupler 315, a third terminal 413 connected to the matching circuit 420, a fourth terminal 414 connected to the mismatching circuit 430, and/or a fifth terminal 415 connected to the transceiver 303.

According to various example embodiments, the communication processor 301 may control the second switch 410 to connect the first terminal 411 to the third terminal 413 for a specified time to output a transmission signal through transmission chain 312. The communication processor 301 may connect the coupler 315 to the matching circuit 420, and perform impedance matching of the coupler 315 by controlling the second switch 410 to connect the first terminal 411 to the third terminal 413. The coupler 315 may separate at least a part of the transmission signal and transmit the separated signal to the transceiver 303 through the fifth terminal 415.

According to various example embodiments, the communication processor 301 may control the second switch 410 to connect the first terminal 411 to the fourth terminal 414 for a specified time to output a reception signal through the reception chain 311. The communication processor 301 may connect the coupler 315 to the mismatching circuit 430 and perform impedance mismatching of the coupler 315 by controlling the second switch 410 to connect the first terminal 411 to the fourth terminal 414 and to connect the second terminal 412 to the fourth terminal 414. The reception signal may be transmitted to the transceiver 303 through the reception chain 311 without being separated by the coupler 315 because the coupler 315 is mismatched. Accordingly, loss of the reception signal by the coupler 315 may be reduced or prevented.

According to various example embodiments, the communication processor 301 may simultaneously control the first switch 313 and the second switch 410. According to an embodiment, the communication processor 301, for a specified time to output the transmission signal, may control the first switch 313 so that the transmission chain 312 and the antenna 320 (or the filter 314) are electrically connected, and control the second switch 410 so that the coupler 315 is electrically connected to the matching circuit 420. The communication processor 301, for a specified time to receive the reception signal, may control the first switch 313 so that the reception chain 311 and the antenna 320 (or the filter 314) are electrically connected, and control the second switch 410 so that the coupler 315 is electrically connected to the mismatching circuit 430.

According to various example embodiments, the mismatching circuit 430 may include a plurality of filters capable of blocking signals of different frequency bands and a separate switch for connecting one filter among the plurality of filters to the fourth terminal 414. The communication processor 430 may select a filter corresponding to the frequency band of the reception signal from among a plurality of filters according to the frequency band of the reception signal, and control the separate switch to connect the selected filter to the fourth terminal 414. Through the above method, the communication circuit 310 may reduce or prevent loss of the reception signal by the coupler 315 even when communication of various frequency bands may be supported.

Although FIG. 4 has been described assuming that the electronic device 101 operates through the TDD communication method, various example embodiments may be applied to the TDD communication method and/or the FDD communication method. An embodiment of the electronic device 101 to which the FDD communication method is applied will be described later with reference to FIGS. 7 to 8.

Figure 5A:
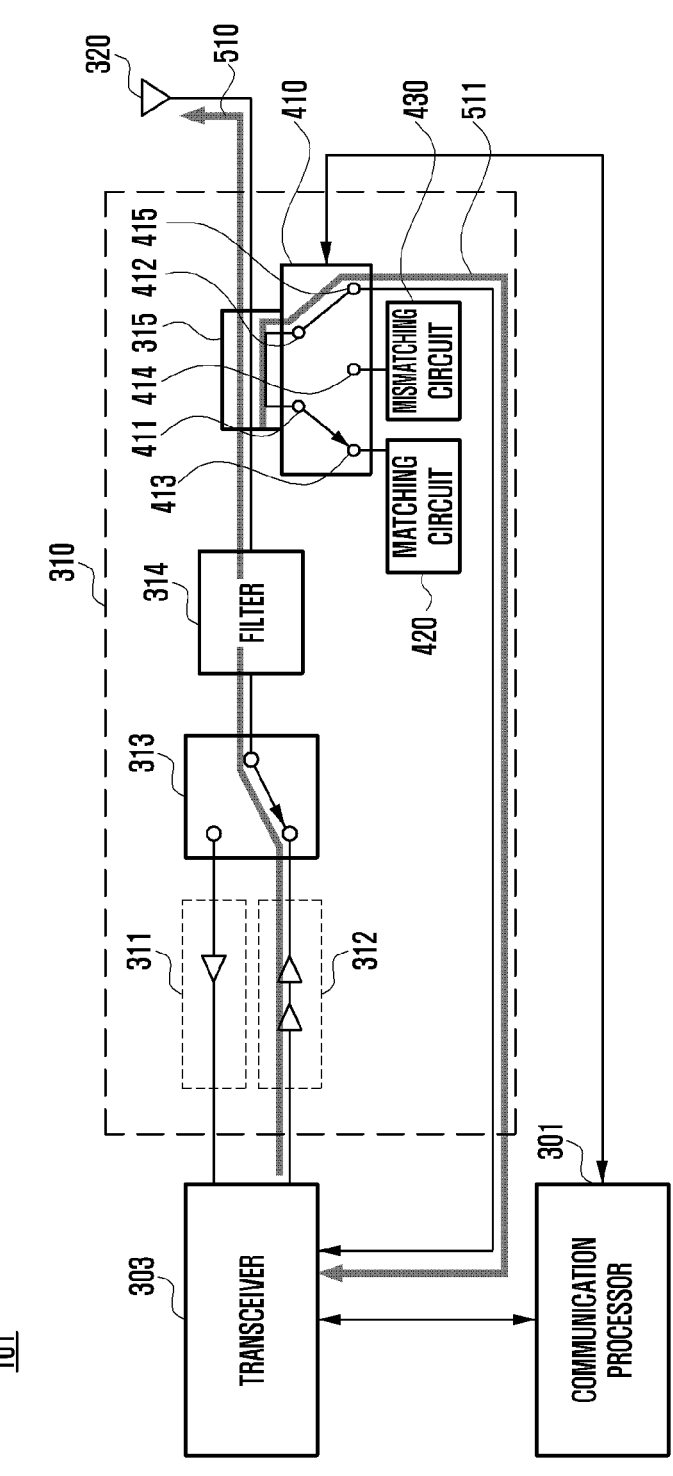
FIG. 5A is a diagram illustrating a transmission path of a transmission signal in an electronic device according to various example embodiments.

FIG. 5A is a diagram illustrating a transmission path of a transmission signal in an electronic device according to various example embodiments.

Referring to FIG. 5A, the communication processor 301, for a specified time to output the transmission signal, may control the first switch 313 so that the transmission chain 312 and the antenna 320 (or the filter 314) are electrically connected, and control the second switch 410 so that the coupler 315 is electrically connected to the matching circuit 420.

According to various example embodiments, the communication processor 301 may transmit data to be transmitted to an external electronic device (e.g., the electronic device 104 of FIG. 1) to the transceiver 303 for a specified time to output a transmission signal. The transceiver 303 may generate a transmission signal 510 by performing a frequency modulation on a signal including data received from the communication processor 301. The transmission signal 510 may be output through the transmission chain 312 and the antenna 320.

According to various example embodiments, the communication processor 301 may electrically connect the coupler 315 to a matching circuit 420 for impedance matching of the coupler 315 for a specified time to output a transmission signal through the transmission chain 312. When the coupler 315 is electrically connected to the matching circuit 420, the coupler 315 may separate a part of the transmission signal 510 while the transmission signal 510 is transmitted to the antenna 320 through the filter 314. The separated transmission signal 511 may be transmitted to the transceiver 303 through the second terminal 412 and the fifth terminal 415. The transceiver 303 may identify the characteristics of the transmission signal 510 based on the separated transmission signal 511, and control the transmission of the transmission signal 510 based on the characteristics of the transmission signal 510.

Figure 5B:
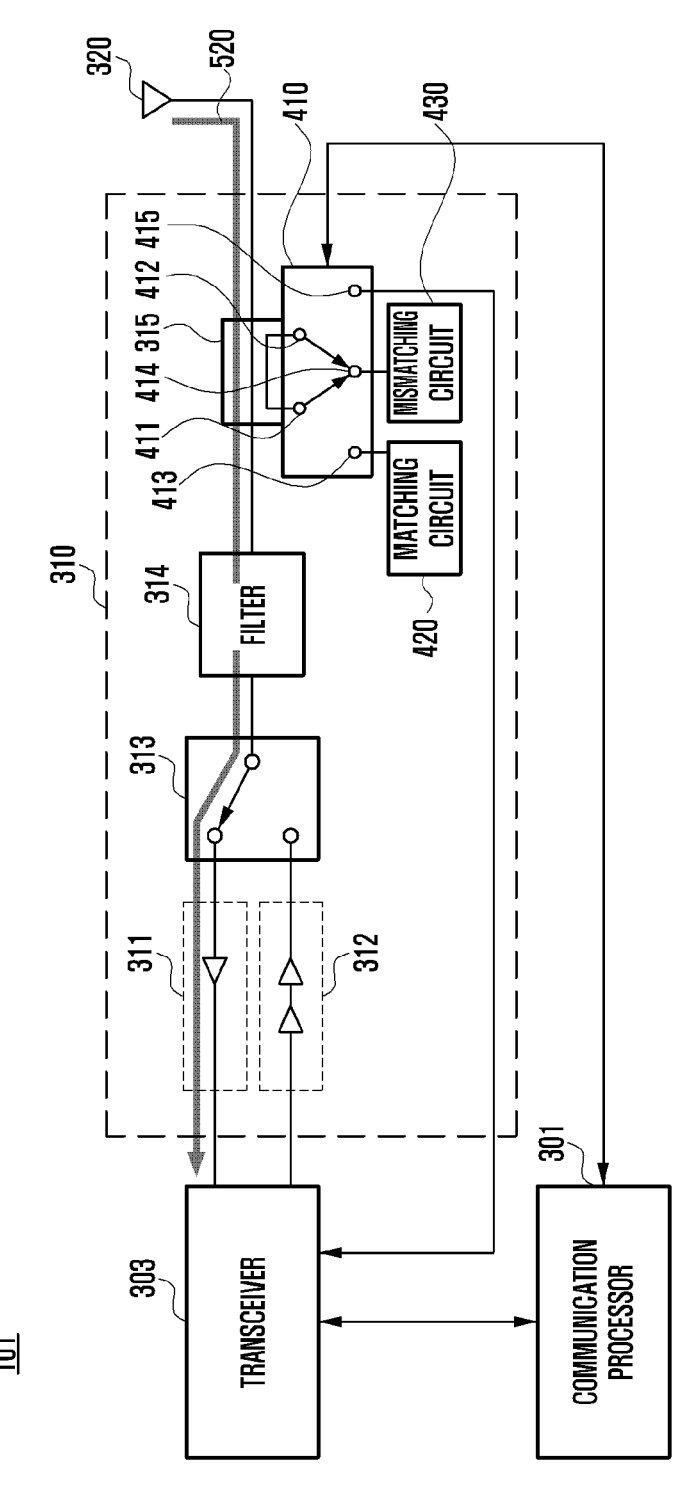
FIG. 5B is a diagram illustrating a path of a reception signal in an electronic device according to various example embodiments.

FIG. 5B is a diagram illustrating a path of a reception signal in an electronic device according to various example embodiments.

Referring to FIG. 5B, the communication processor 301, for a specified time to receive the reception signal, may control the first switch 313 so that the reception chain 311 and the antenna 320 (or the filter 314) are electrically connected, and control the second switch 410 so that the coupler 315 is electrically connected to the mismatching circuit 430. As the first terminal 411 and the second terminal 412 of the second switch 420 are electrically connected to the fourth terminal 414, the coupler 315 may be electrically connected to the mismatching circuit 430.

According to various example embodiments, the electronic device 101 may receive a reception signal 520 through the antenna 320 for a specified time to receive the reception signal. The reception signal 520 received through the antenna 320 may be transferred to the transceiver 303 through the filter 314, the first switch 313, and/or the reception chain 311. The transceiver 303 may perform frequency demodulation of converting a frequency band of the reception signal 520 into a baseband. The transceiver 303 may transmit the processed reception signal 520 to the communication processor 301. The communication processor 301 may transmit data included in the reception signal 520 to an application processor (e.g., the processor 120 of FIG. 1).

According to various example embodiments, the communication processor 301, for a specified time to receive the reception signal 520 through the receive chain 311, may electrically connect the coupler 315 to the mismatching circuit 430 for impedance mismatching of the coupler 315.

According to various example embodiments, impedance mismatching may refer to increasing (or infinite impedance)

or decreasing the impedance of the coupler 315 (e.g., impedance of the coupler 315 measured at the path implemented between the filter 314 and the antenna 320). Increasing (or infinity) or decreasing the impedance of the coupler 315 may reduce the magnitude of a signal separated by the coupler 315. The mismatching circuit 430 may be implemented in an open state or a short state in order to mismatch the impedance of the coupler 315. The mismatching circuit 430 may include an element having a specified impedance (e.g., a large resistance) for impedance mismatching of the coupler 315.

According to various example embodiments, the reception signal 520 may be transmitted to the reception chain 311 without being transmitted to the coupler 315 due to the impedance of the coupler 315. As the reception signal 520 is transmitted to the reception chain 311 without being transmitted to the coupler 315, the electronic device 101 may reduce the loss of the reception signal 520.

Figure 6:
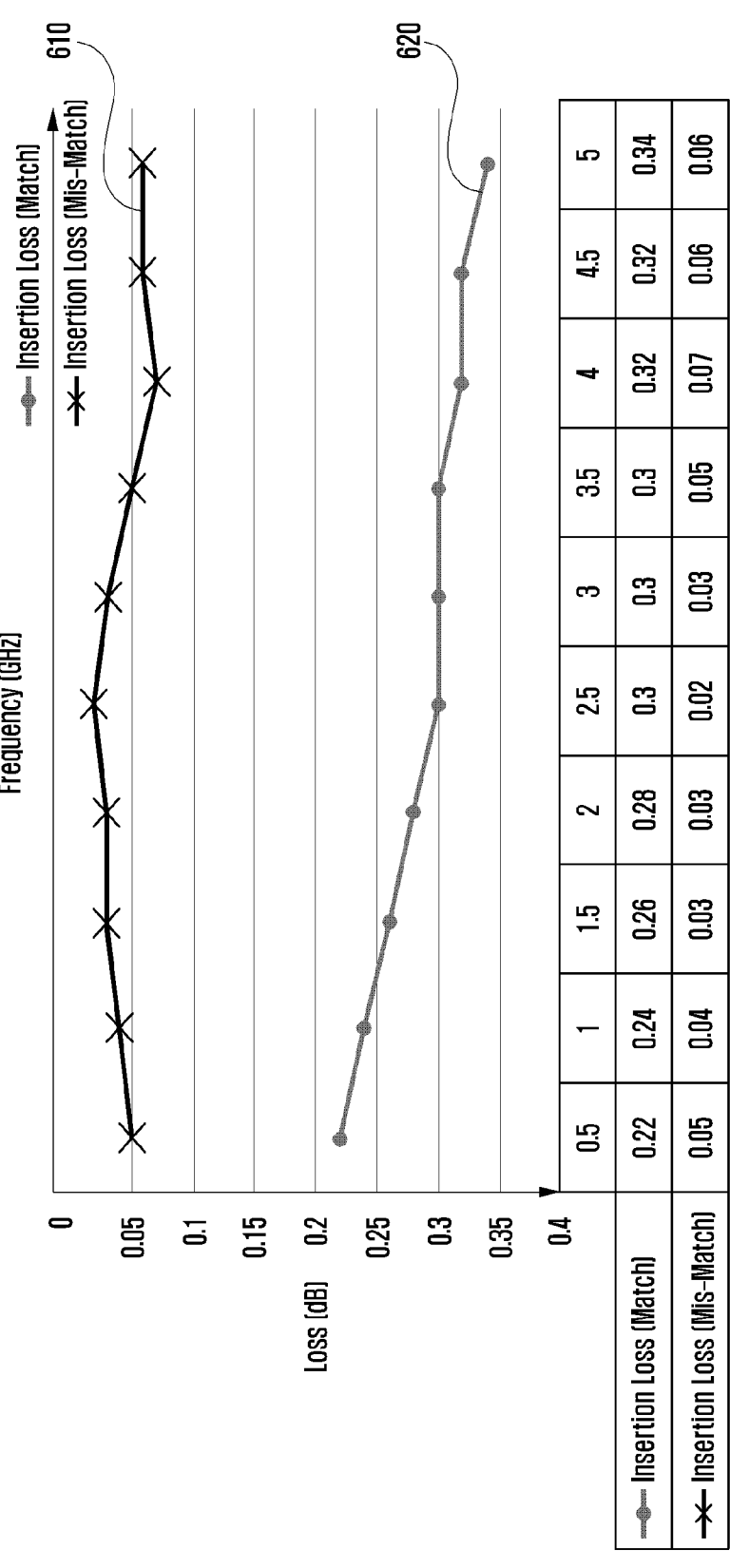
FIG. 6 is a diagram illustrating an insertion loss (IL) of a reception signal that may be generated by a coupler in an electronic device according to various example embodiments.

FIG. 6 is a diagram illustrating an insertion loss (IL) of a reception signal that may be generated by a coupler in an electronic device according to various example embodiments.

FIG. 6 is a graph illustrating the magnitude of the loss of the reception signal by the coupler (e.g., the coupler 315 of FIG. 4) obtaining a part of the reception signal according to a frequency band of the reception signal.

According to various example embodiments, when the coupler (e.g., the coupler 315 of FIG. 4) is connected to the matching circuit (e.g., the matching circuit 420 of FIG. 4), the loss 620 of the reception signal may be 0.2 dB to 0.3 dB. The electronic device 101 illustrated in FIG. 3 may also have the loss 620 of the reception signal of 0.2 dB to 0.3 dB due to the coupler 315.

According to various example embodiments, the communication processor (e.g., the communication processor 301 of FIG. 4), for a specified time to receive the reception signal (e.g., the reception signal 520 of FIG. 5B) through the receive chain (e.g., the reception chain 311 of FIG. 4), may electrically connect the coupler 315 to the mismatching circuit (e.g., the mismatching circuit 430 of FIG. 4) for impedance mismatching of the coupler 315.

According to various example embodiments, impedance mismatching may refer to increasing (or infinite impedance) or decreasing the impedance of the coupler 315 (e.g., impedance of the coupler 315 measured at the path implemented between the filter 314 and the antenna 320). Increasing (or infinity) or decreasing the impedance of the coupler 315 may refer to the decreasing of the strength of a signal separated by the coupler 315. The mismatching circuit 430 may be implemented in an open state or a short state in order to mismatch the impedance of the coupler 315. The mismatching circuit 430 may include an element having a specified impedance (e.g., a large resistance) for impedance mismatching of the coupler 315.

According to various example embodiments, the reception signal 520 may be transmitted to the reception chain 311 without being transmitted to the coupler 315 due to the impedance of the coupler 315. As the reception signal 520 is transmitted to the reception chain 311 without being transmitted to the coupler 315, the electronic device 101 may reduce the loss of the reception signal 520.

Referring to FIG. 6, when the coupler 315 is connected to the mismatching circuit 430, the loss 610 of the reception signal may be 0.02 dB to 0.07 dB. It may be identified that the loss 610 of the reception signal when the coupler 315 is connected to the mismatching circuit 430 is reduced compared to the loss 620 of the reception signal when the coupler 315 is connected to the matching circuit 420.

Figure 7:
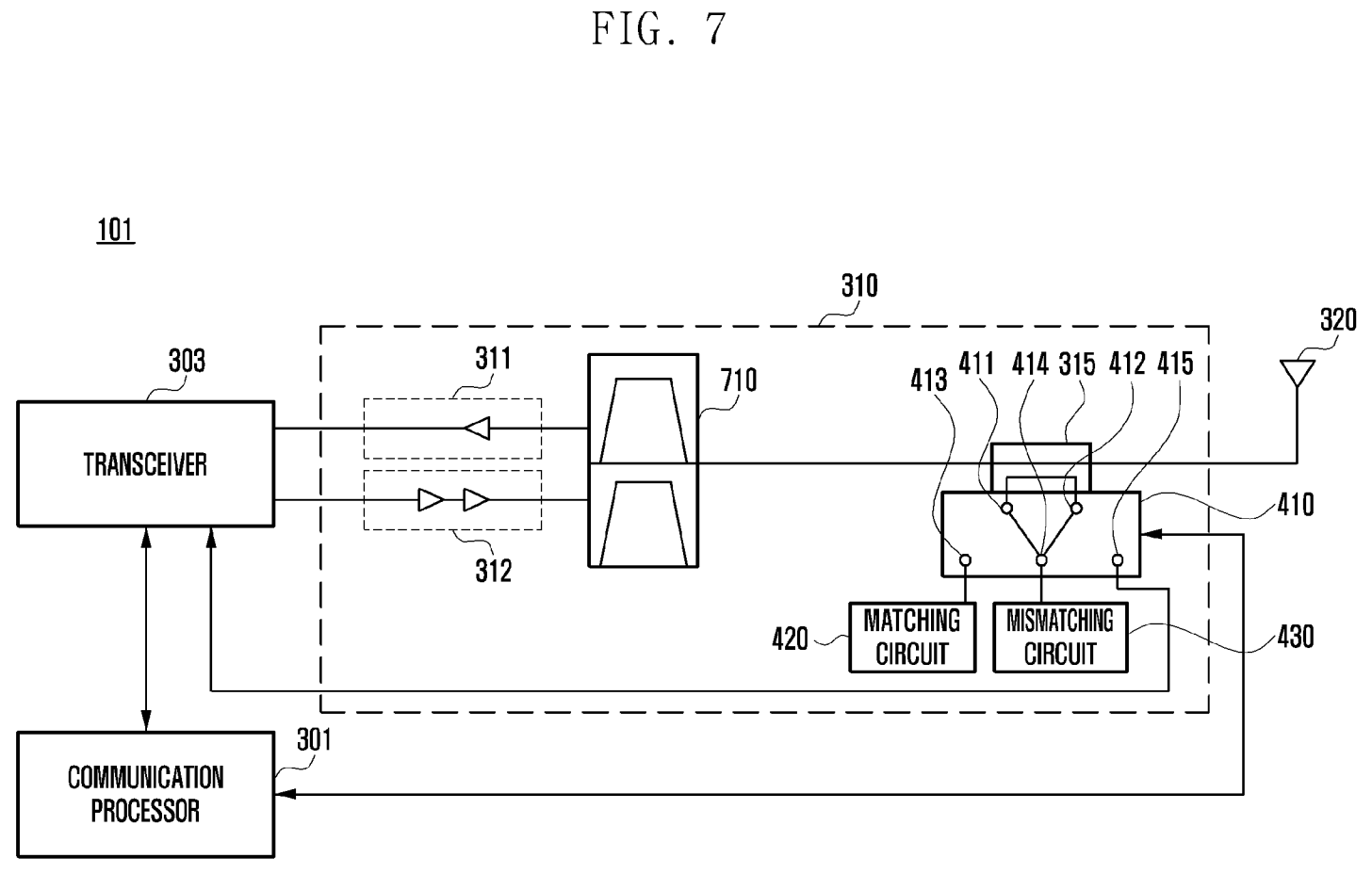

FIG. 7 is a diagram illustrating an electronic device supporting frequency division duplex (FDD) according to various example embodiments.

Referring to FIG. 7, an electronic device (e.g., the electronic device 101 of FIG. 1) according to various example embodiments may include a communication processor 301 (e.g., the first communication processor 212 of FIG. 2 or the second communication processor 214 of FIG. 2), a transceiver 303 (e.g., the first RFIC 222, the second RFIC 224, or the fourth RFIC 228 of FIG. 2), a communication circuit 310, and/or an antenna 320 (e.g., the first antenna module 242, the second antenna module 244, or the third antenna module 246 of FIG. 2).

According to various example embodiments, the communication processor 301 may receive or transmit control data or user data through short-range wireless communication (e.g., Wi-Fi or Bluetooth) or cellular wireless communication (e.g., 4th generation mobile communication or 5th generation mobile communication). The communication processor 301 may establish a cellular communication connection with a base station through control data, and transmit data received from an application processor (e.g., the processor 120 of FIG. 1) to the base station or transmit data received from the base station to the application processor 120 through the established cellular communication.

According to various example embodiments, the electronic device 101 may support a frequency division duplex (FDD) communication method. The FDD communication method may refer to a communication method in which a frequency band of a transmission signal and a frequency band of a reception signal are separated. For example, the FDD communication method is a communication method using both a transmitted signal of a first frequency band and a reception signal of a second frequency band different from the first frequency band, and may be a communication method that enables simultaneous transmission of a transmission signal and/or reception of a reception signal. When the electronic device 101 supports the FDD communication method, the communication processor 301 may receive information on the first frequency band specified to output a transmission signal and the second frequency band specified to receive a reception signal from a base station supporting cellular communication.

According to various example embodiments, the transceiver 303 may perform various operations for processing signals received from the communication processor 310. For example, the transceiver 303 may perform a modulation on a signal received from the communication processor 301. For example, the transceiver 303 may perform a frequency modulation to convert a baseband signal into a radio frequency (RF) signal used for cellular communication. The transceiver 303 may also perform demodulation on a signal received from the outside through the communication circuit 310. For example, the transceiver 303 may perform frequency demodulation to convert a radio frequency (RF) signal into a baseband signal.

According to various example embodiments, the communication circuit 310 may include a reception chain 311 that receives a signal radiated from the outside through the antenna 320 and/or a transmission chain 312 that outputs the signal transmitted by the transceiver 303 through the antenna 320. The reception chain 311 may include various components included in the movement path of the reception signal. For example, the reception chain 311 may include various components (e.g., amplifiers, switches, or filters)

that amplify a reception signal received through the antenna 320 and filter the amplified signal. The transmission chain 312 may include various components included in the movement path of the transmitted signal. For example, the transmission chain 312 may include various components (e.g., amplifiers, switches, or filters) that amplify a signal transmitted by the transceiver 303 and filter the amplified signal.

According to various example embodiments, the communication circuit 310 may include a filter 710 connected to the receive chain 311 and the transmit chain 312. The filter 710 may be a component that separates a signal of the first frequency band and a signal of the second frequency band. For example, the filter 710 may separate the transmission signal of the first frequency band and the reception signal of the second frequency band, transmit the transmission signal of the first frequency band to the antenna 320, and transmit the reception signal of the second frequency band to the reception chain 310.

According to various example embodiments, the communication circuit 310 may include the coupler 315 for obtaining a part of the transmission signal transmitted through the transmission chain 312. The coupler 315 may be connected between the filter 314 and the antenna 320. The part of the transmission signal obtained by the coupler 315 may be transmitted to the transceiver 303. The transceiver 303 may receive the part of the transmission signal transmitted by the coupler and monitor the part of the transmission signal to identify characteristics (e.g., quality and strength of the transmission signal) of the transmission signal.

According to various example embodiments, the communication processor 301 may control the communication circuit 310 so that the coupler 315 is electrically connected to the matching circuit 420 along with the transmission of the transmission signal through the transmission chain 312. When the coupler 315 is electrically connected to the matching circuit 420, the coupler 315 may obtain a part of a signal and transmit the obtained signal to the transceiver 303.

According to various example embodiments, impedance matching of the coupler 315 may refer to matching the impedance of the coupler 315 (e.g., impedance of the coupler 315 measured at the path implemented between the filter 314 and the antenna 320) and the impedance of a path (e.g., impedance of the path implemented between the filter 314 and the antenna 320 measured at the coupler 315) implemented between the filter 314 and the antenna 320. The matching circuit 420 may include an element having a specified impedance for impedance matching of the coupler 315. The specified impedance may have the same value (e.g., 50Ω) as an impedance value (e.g., 50Ω) of the path implemented between the filter 314 and the antenna 320 measured by the coupler 315.

According to various example embodiments, the communication processor 301 may control the communication circuit 310 so that the coupler 315 is electrically connected to the mismatching circuit 430 in response to termination of transmission of the transmission signal through the transmission chain 312 (or in response to reception of the reception signal through the reception chain 311).

According to various example embodiments, impedance mismatching may refer to increasing (or infinite impedance) or decreasing the impedance of the coupler 315 (e.g., impedance of the coupler 315 measured at the path implemented between the filter 314 and the antenna 320). Increasing (or infinity) or decreasing the impedance of the coupler 315 may reduce the magnitude of a signal separated by the coupler 315. The mismatching circuit 430 may be implemented in an open state or a short state in order to mismatch the impedance of the coupler 315. The mismatching circuit 430 may include an element having a specified impedance (e.g., a large resistance) for impedance mismatching of the coupler 315.

According to various example embodiments, the mismatching circuit 430 may be implemented as a filter (e.g., a low pass filter capable of passing signals of a frequency band lower than the frequency band of the reception signal, a high pass filter capable of passing signals of a frequency band higher than the frequency band of the reception signal, and/or a band reject filter that blocks signals of the frequency band of the reception signal) capable of blocking a frequency band of a reception signal.

According to various example embodiments, the communication circuit 310 may include the switch 410 for connecting the matching circuit 420 and/or the mismatching circuit 430 to the coupler 315. The coupler 315 may be electrically connected to the switch 410. The switch 410 may perform a series of operations to reduce or prevent loss of a reception signal by the coupler 315 under the control of the communication processor 301.

According to various example embodiments, the switch 410 may include the first terminal 411 connected to one side of the coupler 315, the second terminal 412 connected to the other side of the coupler 315, the third terminal 413 connected to the matching circuit 420, the fourth terminal 414 connected to the mismatching circuit 430, and/or the fifth terminal 415 connected to the transceiver 303.

According to various example embodiments, the communication processor 301 may control the switch 410 to connect the first terminal 411 to the third terminal 413, and to connect the second terminal 412 to the fifth terminal 415 in response to the output of the transmission signal through the transmission chain 312. The communication processor 301 may connect the coupler 315 to the matching circuit 420, and perform impedance matching of the coupler 315 by controlling the switch 410 to connect the first terminal 411 to the third terminal 413. The coupler 315 may separate at least a part of the transmission signal and transmit the separated signal to the transceiver 303 through the fifth terminal 415.

According to various example embodiments, the communication processor 301 may control the switch 410 to connect the first terminal 411 to the fourth terminal 414, and to connect the second terminal 412 to the fourth terminal 414 in response to the termination of the output of the transmission signal through the transmission chain 312 (or in response to the reception of the reception signal through the reception chain 311). The communication processor 301 may connect the coupler 315 to the mismatching circuit 430 and perform impedance mismatching of the coupler 315 by controlling the switch 410 to connect the first terminal 411 to the second terminal 412 to the fourth terminal 414. The reception signal may be transmitted to the transceiver 303 through the reception chain 311 without being separated by the coupler 315 because the coupler 315 is mismatched. Accordingly, the electronic device may reduce or prevent loss of the reception signal by the coupler 315.

According to various example embodiments, the mismatching circuit 430 may include a plurality of filters capable of blocking signals of different frequency bands and a separate switch for connecting one filter among the plurality of filters to the fourth terminal 414. The communication processor 430 may select a filter corresponding to the frequency band of the reception signal from among a plurality of filters according to the frequency band of the reception signal, and control the separate switch to connect the selected filter to the fourth terminal 414. Through the above method, the communication circuit 310 may reduce or prevent loss of the reception signal by the coupler 315 even when communication of various frequency bands may be supported.

According to various example embodiments, the electronic device 101 may take a relatively longer time (or number of times) to receive the reception signal than the time (or number of times) to output the transmission signal. The electronic device 101 may operate in a method of controlling the switch 420 to connect the coupler 315 to the matching circuit 420 in response to transmission of a transmission signal while maintaining a state in which the coupler 315 and the mismatching circuit 430 are connected.

Figure 8:
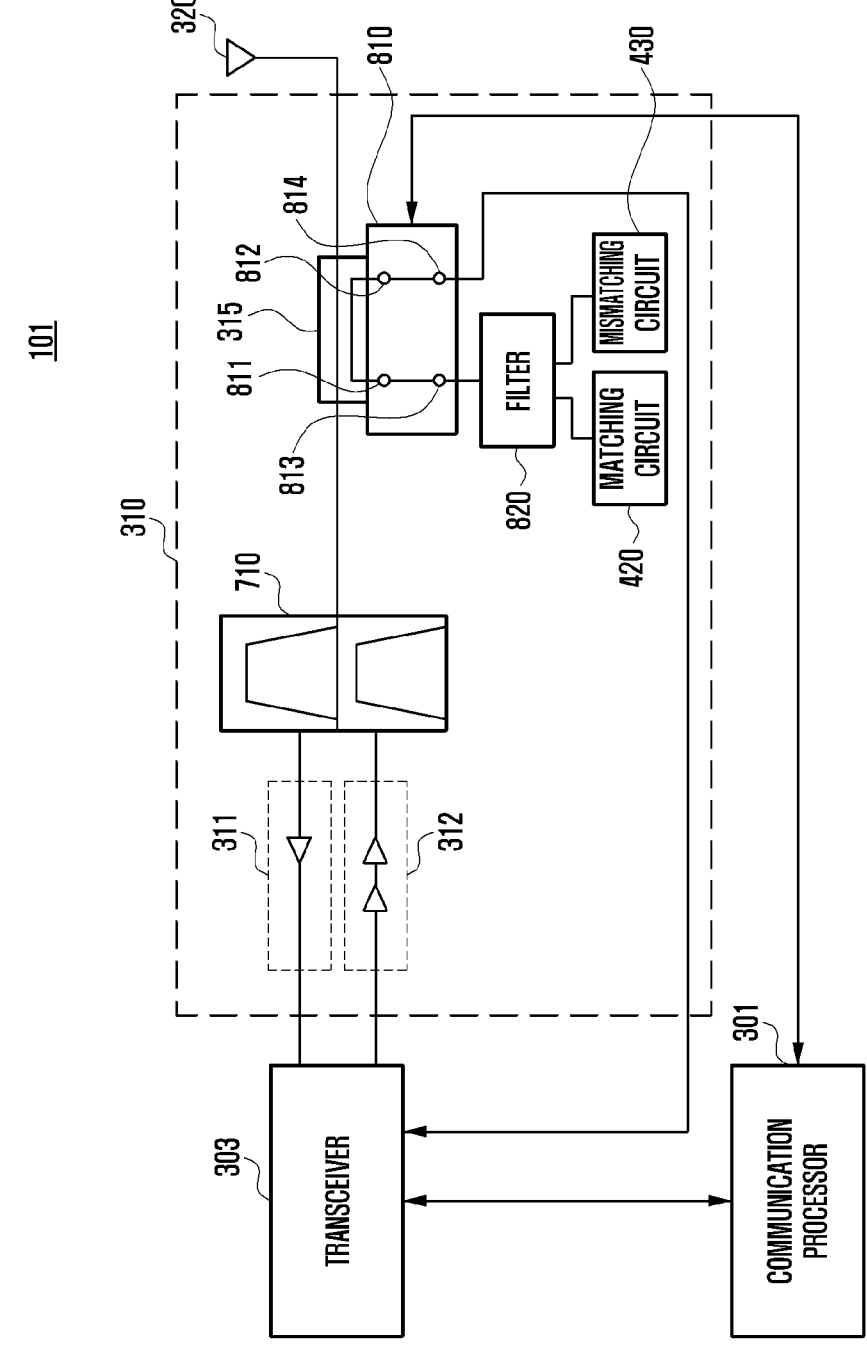
FIG. 8 is a diagram illustrating an electronic device supporting FDD according to various example embodiments.

FIG. 8 is a diagram illustrating an electronic device supporting FDD according to various example embodiments.

The electronic device 101 illustrated in FIG. 8 may be an electronic device (e.g., the electronic device 101 of FIG. 1) supporting the FDD communication method. The FDD communication method may refer to a communication method in which a frequency band of a transmission signal and a frequency band of a reception signal are separated. For example, the FDD communication method is a communication method using both a transmitted signal of a first frequency band and a reception signal of a second frequency band different from the first frequency band, and may be a communication method that enables simultaneous transmission of a transmission signal and/or reception of a reception signal. When the electronic device 101 supports the FDD communication method, the communication processor 301 may receive information on the first frequency band specified to output a transmission signal and the second frequency band specified to receive a reception signal from a base station supporting cellular communication.

For a clear description, descriptions of components illustrated in FIG. 7 are omitted.

According to various example embodiments, a switch 810 (e.g., the switch 410 of FIG. 7) may include a first terminal 811 connected to one side of the coupler 315, a second terminal 812 connected to the other side of the coupler 315, a third terminal 813 connected to a filter 820, and/or a fourth terminal 814 connected to the transceiver 303.

According to various example embodiments, one side of the coupler 315 may be connected to the filter 820 through the first terminal 811 and/or the third terminal 813, and the other side of the coupler 815 may be connected to the transceiver 303 through the second terminal 812 and/or the fourth terminal 814.

According to various example embodiments, the filter 820 may be a component that separates a signal of the first frequency band and a signal of the second frequency band. For example, the filter 820 may be a duplexer or a diplexer capable of separating the transmission signal of the first frequency band and the reception signal of the second frequency band. The filter 820 may implement an effect of electrically connecting the coupler 315 to the matching circuit 420 in a situation in which a transmission signal of the first frequency band is transmitted. The coupler 315 may obtain a part of the transmission signal of the first frequency band. The filter 820 may implement an effect of electrically connecting the coupler 315 to the mismatching circuit 430 in a situation in which a reception signal of the second frequency band is received. The coupler 315 may reduce the magnitude of a part of the reception signal of the second frequency band obtained by the coupler 315 by being electrically connected to the mismatching circuit 430.

According to various example embodiments, the coupler 315 may be electrically connected to the matching circuit 420 and/or the mismatching circuit 430 through the filter 820. The coupler 315 may be in a state in which impedance matching is performed by the matching circuit 420 in a state in which a transmission signal is transmitted to the antenna 320. The coupler 315 may obtain a part of the transmit signal and transmit the part of the transmit signal to the transceiver 303 through the fourth terminal 814. The coupler 315 may be in a state in which impedance mismatching is performed by the mismatching circuit 430 in a state in which a reception signal is received through the antenna 320. The reception signal may be transmitted to the transceiver 303 through the reception chain 311 without being separated by the coupler 315 because the coupler 315 is mismatched. Accordingly, loss of the reception signal by the coupler 315 may be reduced or prevented.

Figure 9:
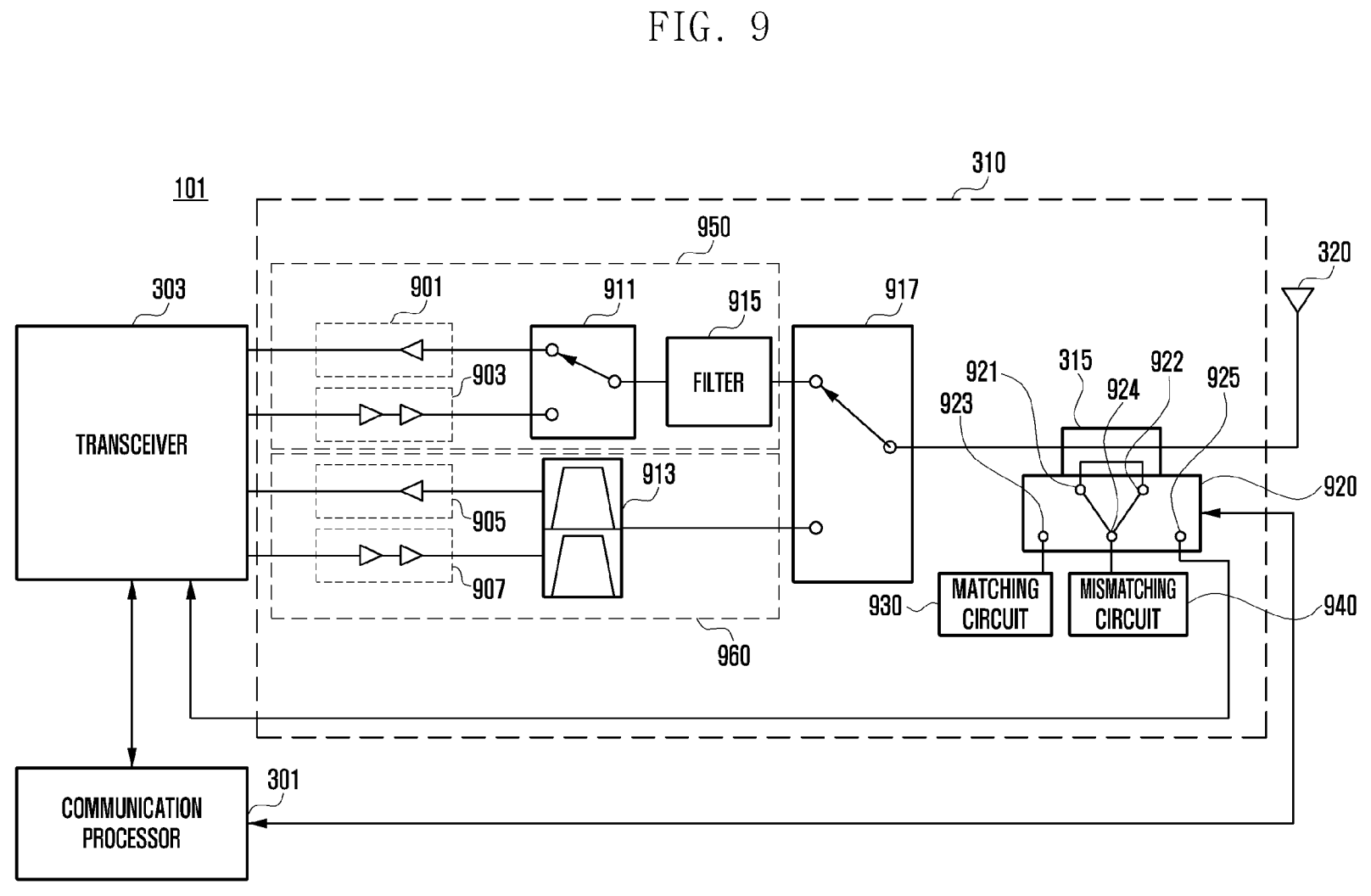

FIG. 9 is a diagram illustrating an electronic device supporting TDD and FDD communication according to various example embodiments.

Referring to FIG. 9, an electronic device (e.g., the electronic device 101 of FIG. 1) according to various example embodiments may include a communication processor 301 (e.g., the first communication processor 212 of FIG. 2 or the second communication processor 214 of FIG. 2), a transceiver 303 (e.g., the first RFIC 222, the second RFIC 224, or the fourth RFIC 228 of FIG. 2), a communication circuit 310, and/or an antenna 320 (e.g., the first antenna module 242, the second antenna module 244, or the third antenna module 246 of FIG. 2).

According to various example embodiments, the communication processor 301 may receive or transmit control data or user data through short-range wireless communication (e.g., Wi-Fi or Bluetooth) or cellular wireless communication (e.g., 4th generation mobile communication or 5th generation mobile communication). The communication processor 301 may establish a cellular communication connection with a base station through control data, and transmit data received from an application processor (e.g., the processor 120 of FIG. 1) to the base station or transmit data received from the base station to the application processor 120 through the established cellular communication.

According to various example embodiments, the transceiver 303 may perform various operations for processing signals received from the communication processor 310. For example, the transceiver 303 may perform a modulation on a signal received from the communication processor 301. For example, the transceiver 303 may perform a frequency modulation to convert a baseband signal into a radio frequency (RF) signal used for cellular communication. The transceiver 303 may also perform demodulation on a signal received from the outside through the communication circuit 310. For example, the transceiver 303 may perform frequency demodulation to convert a radio frequency (RF) signal into a baseband signal.

According to various example embodiments, the electronic device 101 may support a time division duplex (TDD) and or a frequency division duplex (FDD) communication method. The TDD communication method may refer to a communication method in which an output time of a transmission signal and a reception time of a reception signal are separated. For example, the TDD communication method is a communication method in which output of a transmission signal and reception of a reception signal cannot be simultaneously performed, and may be a communication method in which a time specified for outputting a transmission signal and a time specified for receiving a reception signal are different from each other. When the electronic device 101 supports the TDD communication method, the communication processor 301 may receive information on a specified time to output the transmission signal and a specified time to receive the reception signal from a base station supporting cellular communication.

The FDD communication method may refer to a communication method in which a frequency band of a transmission signal and a frequency band of a reception signal are separated. For example, the FDD communication method is a communication method using both a transmitted signal of a first frequency band and a reception signal of a second frequency band different from the first frequency band, and may be a communication method that enables simultaneous transmission of a transmission signal and/or reception of a reception signal. When the electronic device 101 supports the FDD communication method, the communication processor 301 may receive information on the first frequency band specified to output a transmission signal and the second frequency band specified to receive a reception signal from a base station supporting cellular communication.

According to various example embodiments, in order to support both the FDD communication method and the TDD communication method, the communication circuit 310 may include components 950 (e.g., a first reception chain 901, a first transmission chain 903, a first switch 911, and a filter 915) for the TDD communication method and components 960 (e.g., a second reception chain 905, a second transmission chain 907, and a filter 913) for the FDD communication method.

According to various example embodiments, the communication circuit 310 may include the first reception chain 901 and/or the second reception chain 905 that receives a signal radiated from the outside through the antenna 320. The first reception chain 901 and/or the second reception chain 905 may include various components included in the movement path of the reception signal. For example, first reception chain 901 and/or the second reception chain 905 may include various components (e.g., amplifiers, switches, or filters) that amplify a reception signal received through the antenna 320 and filter the amplified signal.

According to various example embodiments, the first reception chain 901 may be a reception chain that receives a reception signal through wireless communication using a TDD method, and the second reception chain 905 may be a reception chain that receives a reception signal through wireless communication using a FDD method.

According to various example embodiments, the communication circuit 310 may include the first transmission chain 903 and/or the second transmission chain 907 that outputs the signal transmitted by the transceiver 303 through the antenna 320. The first transmission chain 903 and/or the second transmission chain 907 may include various components included in the movement path of the transmission signal. For example, the first transmission chain 903 and/or the second transmission chain 907 may include various components (e.g., amplifiers, switches, or filters) that amplify a signal transmitted by the transceiver 303 and filter the amplified signal.

According to various example embodiments, the first transmission chain 903 may be a transmission chain that transmits a transmission signal through wireless communication using a TDD method, and the second transmission chain 907 may be a transmission chain that transmits a transmission signal through wireless communication using a FDD method.

According to various example embodiments, the communication circuit 310 may include the first switch 911 capable of selectively connecting one chain of the first reception chain 901 and the first transmission chain 903 to the filter 915. The first switch 911 may electrically connect the first transmission chain 903 to the filter 915 based on the control of the communication processor 301 for a specified time to output the transmission signal through the first transmission chain 903. The first switch 911 may electrically connect the first reception chain 901 to the filter 915 based on the control of the communication processor 301 for a specified time to receive the reception signal through the first reception chain 901.

According to various example embodiments, the communication circuit 310 may include the filter 915 for filtering a signal of a specified frequency band among signals transmitted through the first reception chain 901 and/or the first transmission chain 903.

According to various example embodiments, the communication circuit 310 may include the filter 913 connected to the second reception chain 905 and the second transmission chain 907. The filter 913 may be a component that separates a signal of the first frequency band from a signal of the second frequency band. For example, the filter 913 may separate the transmission signal of the first frequency band and the reception signal of the second frequency band, transmit the transmission signal of the first frequency band to a third switch 917, and transmit the reception signal of the second frequency band to the second reception chain 905.

According to various example embodiments, the communication circuit 310 may include the third switch 917 capable of connecting the antenna 320 to one of the components 950 for the FDD communication method and the components 960 for the TDD communication method. The communication processor 301 may identify a used communication method (TDD communication method or FDD communication method) and control the third switch 917 based on the identified communication method. For example, the communication processor 301 may control the third switch 917 to connect the filter 915 to the antenna 320 in response to the TDD communication method being used, and output or receive a transmission signal and/or a reception signal of the TDD communication method through the antenna 320. For another example, the communication processor 301 may control the third switch 917 to connect the filter 915 to the antenna 320 in response to the FDD communication method being used, and output or receive a transmission signal and/or a reception signal of the FDD communication method through the antenna 320.

According to various example embodiments, the communication circuit 310 may include the coupler 315 for obtaining a part of the transmission signal transmitted through the first transmission chain 903 and the second transmission chain 907. The coupler 315 may be connected between the third switch 917 and the antenna 320. The part of the transmission signal obtained by the coupler 315 may be transmitted to the transceiver 303. The transceiver 303 may receive the part of the transmission signal transmitted by the coupler and monitor the part of the transmission signal to identify characteristics (e.g., quality and strength of the transmission signal) of the transmission signal.

According to various example embodiments, the communication processor 301 may perform a series of operations to reduce or prevent loss of a reception signal by the coupler 315.

According to various example embodiments, the communication processor 301 may control the third switch 917 to connect the filter 915 to the antenna 320 in response to the TDD communication method being used. The communication processor 301 may electrically connect the coupler 315 to the matching circuit 930 for impedance matching of the coupler 315 for a specified time to output a transmission signal through the first transmission chain 903. When the coupler 315 is electrically connected to the matching circuit 930, the coupler 315 may obtain a part of a signal and transmit the obtained signal to the transceiver 303.

According to various example embodiments, impedance matching of the coupler 315 may refer to matching the impedance of the coupler 315 (e.g., impedance of the coupler 315 measured at the path implemented between the third switch 917 and the antenna 320) and the impedance of a path (e.g., impedance of the path implemented between the third switch 917 and the antenna 320 measured at the coupler 315) implemented between the third switch 917 and the antenna 320. The matching circuit 930 may include an element having a specified impedance for impedance matching of the coupler 315. The specified impedance may have the same value (e.g., 50Ω) as an impedance value (e.g., 50Ω) of the path implemented between the third switch 917 and the antenna 320 measured by the coupler 315.

The communication processor 301 may electrically connect a mismatching circuit 940 for impedance mismatching of the coupler 315 to the coupler 315 for a specified time to receive the reception signal through the first reception chain 901.

According to various example embodiments, impedance mismatching may refer to increasing (or infinite impedance) or decreasing the impedance of the coupler 315 (e.g., impedance of the coupler 315 measured at the path implemented between the third switch 917 and the antenna 320). Increasing (or infinity) or decreasing the impedance of the coupler 315 may refer to the decreasing of the magnitude of a signal separated by the coupler 315. The mismatching circuit 940 may be implemented in an open state or a short state in order to mismatch the impedance of the coupler 315. The mismatching circuit 940 may include an element having a specified impedance (e.g., a large resistance) for impedance mismatching of the coupler 315.

According to various example embodiments, the mismatching circuit 940 may be implemented as a filter (e.g., a low-pass filter capable of passing signals of a frequency band lower than the frequency band of the reception signal, a high-pass filter capable of passing signals of a frequency band higher than the frequency band of the reception signal, and/or a band-reject filter that blocks signals of the frequency band of the reception signal) capable of blocking a frequency band of a reception signal.

According to various example embodiments, the communication circuit 310 may include a second switch 920 for connecting the matching circuit 930 and/or the mismatching circuit 940 to the coupler 315. The coupler 315 may be electrically connected to the second switch 920. The switch 920 may perform a series of operations to reduce or prevent loss of a reception signal by the coupler 315 under the control of the communication processor 301.

According to various example embodiments, the second switch 920 may include a first terminal 921 connected to one side of the coupler 315, a second terminal 922 connected to the other side of the coupler 315, a third terminal 923 connected to the matching circuit 930, a fourth terminal 924 connected to the mismatching circuit 940, and/or a fifth terminal 925 connected to the transceiver 303.

According to various example embodiments, the communication processor 301 may control the second switch 920 to connect the first terminal 921 to the third terminal 923, and to connect the second terminal 922 to the fifth terminal 925 for a specified time to output the transmission signal through the first transmission chain 903. The communication processor 301 may connect the coupler 315 to the matching circuit 930, and perform impedance matching of the coupler 315 by controlling the second switch 920 to connect the first terminal 921 to the third terminal 923 and to connect the second terminal 922 to the fifth terminal 925. The coupler 315 may separate at least a part of the transmission signal and transmit the separated signal to the transceiver 303 through the fifth terminal 925.

According to various example embodiments, the communication processor 301 may control the second switch 920 to connect the first terminal 921 and the second terminal 922 to the fourth terminal 924, and to connect the second terminal 922 to the fifth terminal 924 for a specified time to output the reception signal through the first reception chain 901. The communication processor 301 may connect the coupler 315 to the mismatching circuit 940, and perform impedance mismatching of the coupler 315 by controlling the second switch 920 to connect the first terminal 921 and the second terminal 922 to the fourth terminal 924. The reception signal may be transmitted to the transceiver 303 through the first reception chain 901 without being separated by the coupler 315 because the coupler 315 is mismatched. Accordingly, loss of the reception signal by the coupler 315 may be reduced or prevented.

According to various example embodiments, the communication processor 301 may control the third switch 917 to connect the filter 913 to the antenna 320 in response to the FDD communication method being used. The communication processor 301 may control the communication circuit 310 so that the coupler 315 is electrically connected to the matching circuit 930 together with transmission of the transmission signal through the second transmission chain 907. When the coupler 315 is electrically connected to the matching circuit 930, the coupler 315 may obtain a part of a signal and transmit the obtained signal to the transceiver 303.

According to various example embodiments, the communication processor 301 may control the communication circuit 310 so that the coupler 315 is electrically connected to the mismatching circuit 940 in response to termination of the transmission of the transmission signal through the second transmission chain 907 (or in response to reception of the reception signal through the second reception chain 905).

According to various example embodiments, the communication processor 301 may control the second switch 920 to connect the first terminal 921 to the third terminal 923 in response to the output of the transmission signal through the transmission chain 312. The communication processor 301 may connect the coupler 315 to the matching circuit 930, and perform impedance matching of the coupler 315 by controlling the second switch 920 to connect the first terminal 921 to the third terminal 923. The coupler 315 may separate at least a part of the transmission signal and transmit the separated signal to the transceiver 303 through the fifth terminal 925.

According to various example embodiments, the communication processor 301 may control the second switch 920 to connect the first terminal 9211 and the second terminal 922 to the fourth terminal 924 in response to the termination of the output of the transmission signal through the transmission chain 312 (or in response to the reception of the reception signal through the reception chain 311). The communication processor 301 may connect the coupler 315 to the mismatching circuit 940 and perform impedance mismatching of the coupler 315 by controlling the second switch 920 to connect the first terminal 921 to the third terminal 923. The reception signal may be transmitted to the transceiver 303 through the second reception chain 905 without being separated by the coupler 315 because the coupler 315 is mismatched. Accordingly, the electronic device may reduce or prevent loss of the reception signal by the coupler 315.

As illustrated in FIG. 9, the electronic device 101 according to various example embodiments may reduce or prevent loss of a reception signal even when supporting both the TDD communication method and the FDD communication method.

Figure 10:
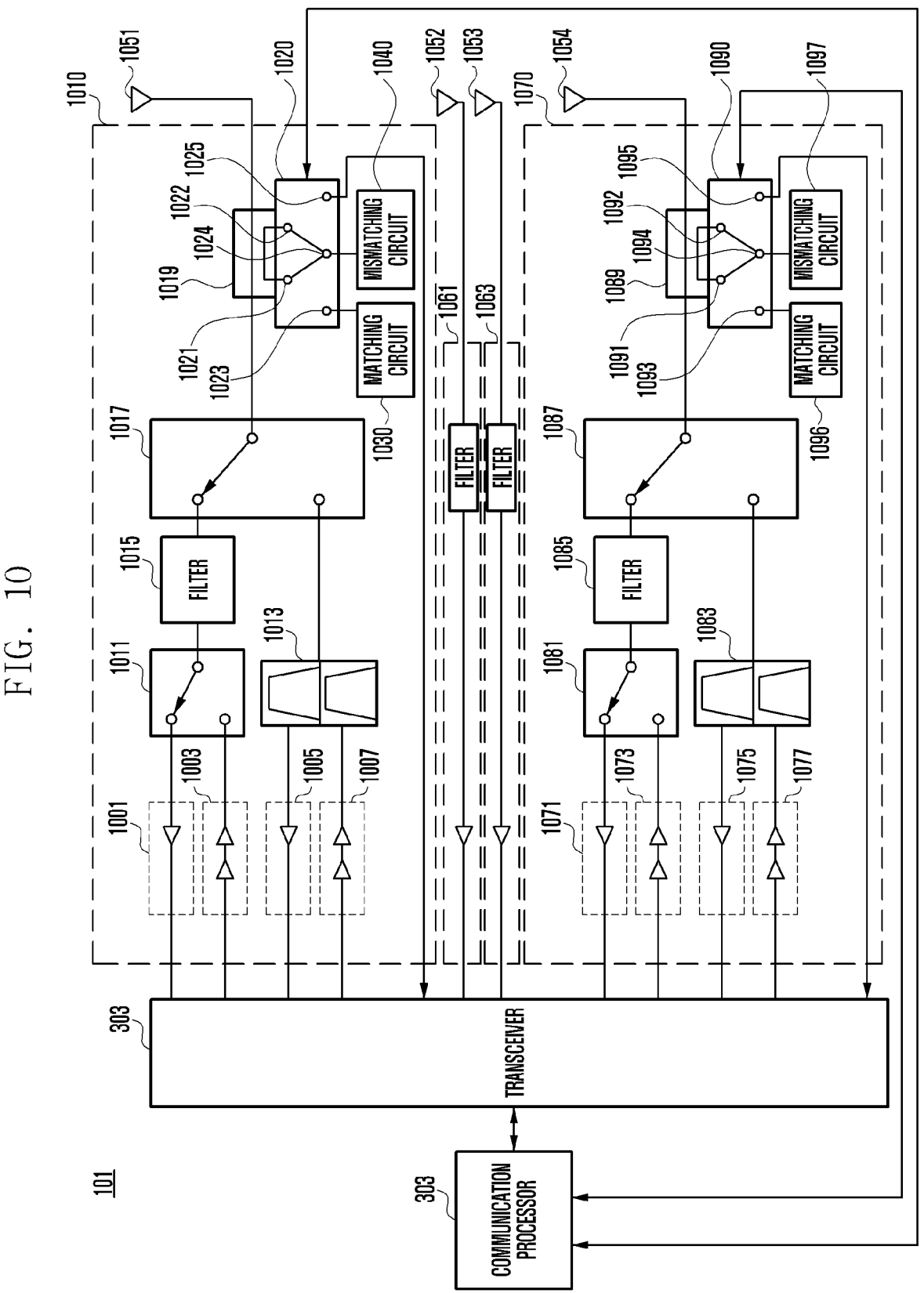
FIG. 10 is a diagram illustrating an electronic device according to various example embodiments.

FIG. 10 is a diagram illustrating an electronic device according to various example embodiments.

The circuit structure capable of reducing or preventing the loss of a reception signal described in FIGS. 4 to 9 may also be applied to an electronic device capable of outputting a plurality of transmission signals through a plurality of communication methods.

Referring to FIG. 10, an electronic device (e.g., the electronic device 101 of FIG. 1) according to various example embodiments may include a communication processor 1010 (e.g., the first communication processor 212 of FIG. 2 or the second communication processor 214 of FIG. 2), the transceiver 303 (e.g., the first RFIC 222, the second RFIC 224, or the fourth RFIC 228 of FIG. 2), the first communication circuit 310, a second communication circuit 1061, a third communication circuit 1063, a fourth communication circuit 1070, a first antenna 1051 (e.g., the first antenna module 242, the second antenna module 244, or the third antenna module 246 of FIG. 2), a second antenna 1052 (e.g., the first antenna module 242, the second antenna module 244, or the third antenna module 246 of FIG. 2), a third antenna 1053 (e.g., the first antenna module 242, the second antenna module 244, or the third antenna module 246 of FIG. 2), and/or a fourth antenna 1054 (e.g., the first antenna module 242, the second antenna module 244, or the third antenna module 246 of FIG. 2). Each antenna module, of course, comprises an antenna.

According to various example embodiments, the communication processor 301 may receive or transmit control data or user data through short-range wireless communication (e.g., Wi-Fi or Bluetooth) or cellular wireless communication (e.g., 4th generation mobile communication or 5th generation mobile communication). The communication processor 301 may establish a cellular communication connection with a base station through control data, and transmit data received from an application processor (e.g., the processor 120 of FIG. 1) to the base station or transmit data received from the base station to the application processor 120 through the established cellular communication.

According to various example embodiments, the transceiver 303 may perform various operations for processing signals received from the communication processor 310. For example, the transceiver 303 may perform a modulation on a signal received from the communication processor 301. For example, the transceiver 303 may perform a frequency modulation to convert a baseband signal into a radio frequency (RF) signal used for cellular communication. The transceiver 303 may also perform demodulation on a signal received from the outside through the communication circuit 310. For example, the transceiver 303 may perform frequency demodulation to convert a radio frequency (RF) signal into a baseband signal.

According to various example embodiments, the electronic device 101 may support dual connectivity (e.g., E-UTRA-NR-Dual connectivity (EN-DC)) simultaneously using different cellular communication methods including first cellular communication (e.g., LTE) and second cellular communication (e.g., NR) and and/or carrier aggregation, which is a data communication method using a plurality of frequency bands. The electronic device 101 may output a transmission signal of the first cellular communication or receive a reception signal of the first cellular communication through the first antenna 1051. The electronic device 101 may output a transmission signal of the second cellular communication or receive a reception signal of the second cellular communication through the fourth antenna 1054. The electronic device 101 may receive a reception signal of the first cellular communication and/or a reception signal of the second cellular communication through the second antenna 1052 and/or the third antenna 1053.

According to various example embodiments, the electronic device 101 may include the first communication circuit (e.g., the communication circuit 310 of FIG. 9) 1010 for performing the first cellular communication. In order to support both the FDD communication method and the TDD communication method, the first communication circuit 1010 may include components (e.g., a first reception chain 1001 (e.g., the first reception chain 901 of FIG. 9), a first transmission chain 1003 (e.g., the first transmission chain 903 of FIG. 9), a first switch 1011 (e.g., the first switch 911 of FIG. 9), and a filter 1015 (e.g., the filter 915 of FIG. 9)) for the TDD communication method, components (e.g., a second reception chain 1005 (e.g., the second reception chain 905 of FIG. 9), a second transmission chain 1007 (e.g., the second transmission chain 907 of FIG. 9), and a filter 1013 (e.g., the filter 913 of FIG. 9)) for the FDD communication method, a third switch 1017 (e.g., the third switch 917 of FIG. 9) and/or a coupler 1019 (e.g., the coupler 315 of FIG. 9), and a second switch 1020 (e.g., the second switch 920 of FIG. 9). For a clear description, descriptions of elements identical to or similar to those illustrated in FIG. 9 will be omitted.

According to various example embodiments, the electronic device 101 may include a second communication circuit 1061 for receiving a reception signal of the first cellular communication and/or a reception signal of the second cellular communication. The second communication circuit 1061 may include various components (e.g., filters or amplifiers) included in a movement path of the reception signal of the first cellular communication and/or the reception signal of the second cellular communication received through the second antenna 1052.

According to various example embodiments, the electronic device 101 may include a third communication circuit 1063 for receiving a reception signal of the first cellular communication and/or a reception signal of the second cellular communication. The third communication circuit 1063 may include various components (e.g., filters or amplifiers) included in a movement path of the reception signal of the first cellular communication and/or the reception signal of the second cellular communication received through the third antenna 1053.

According to various example embodiments, the electronic device 101 may include the fourth communication circuit (e.g., the communication circuit 310 of FIG. 9) 1070 for performing the first cellular communication. In order to support both the FDD communication method and the TDD communication method, the first communication circuit 1010 may include components (e.g., a third reception chain 1071 (e.g., the first reception chain 901 of FIG. 9), a third transmission chain 1073 (e.g., the first transmission chain 903 of FIG. 9), a fourth switch 1081 (e.g., the first switch 911 of FIG. 9), and a filter 1085 (e.g., the filter 915 of FIG. 9)) for the TDD communication method, components (e.g., a fourth reception chain 1075 (e.g., the second reception chain 905 of FIG. 9), a fourth transmission chain 1077 (e.g., the second transmission chain 907 of FIG. 9), and a filter 1083 (e.g., the filter 913 of FIG. 9)) for the FDD communication method, a sixth switch 1087 (e.g., the third switch 917 of FIG. 9) and/or a coupler 1089 (e.g., the coupler 315 of FIG. 9), and a fifth switch 1090 (e.g., the second switch 920 of FIG. 9). For a clear description, descriptions of elements identical to or similar to those illustrated in FIG. 9 will be omitted. Each chain, of course, comprises conductive material.

According to various example embodiments, the communication processor 301 may perform a series of operations to reduce or prevent loss of a reception signal of the first cellular communication by the coupler 1019. According to an embodiment, the communication processor 301 may control the first communication circuit 1010 so that the coupler 1019 is connected to the mismatching circuit 1040 while receiving the reception signal of the first cellular communication.

According to various example embodiments, the second switch 1020 may include a first terminal 1021 connected to one side of the coupler 1019, a second terminal 1022 connected to the other side of the coupler 1019, a third terminal 1023 connected to the matching circuit 1030, a fourth terminal 1024 connected to the mismatching circuit 1040, and/or a fifth terminal 1025 connected to the transceiver 303. The communication processor 301 may control the second switch 1020 to connect the second terminal 1022 to the fourth terminal 1024 while receiving the reception signal of the first cellular communication so that the coupler 1019 is connected to the mismatching circuit 1040. The reception signal may be transmitted to the transceiver 303 through the second reception chain 1005 without being separated by the coupler 1019 because the coupler 1019 is mismatched. Accordingly, the reception signal may reduce or prevent loss of the reception signal by the coupler 1019.

According to various example embodiments, the communication processor 301 may control the second switch 1020 to connect the first terminal 1021 to the third terminal 1023 while outputting the transmission signal of the first cellular communication. As the coupler 1019 is impedance matched, a part of the transmission signal may be separated by the coupler 1019. The part of the transmission signal separated by the coupler 1019 may be transmitted to the transceiver 303 through the fifth terminal 1025.

According to various example embodiments, the communication processor 301 may perform a series of operations to reduce or prevent loss of a reception signal of the second cellular communication by the coupler 1019. According to an embodiment, the communication processor 301 may control the fourth communication circuit 1070 so that the coupler 1019 is connected to the mismatching circuit 1097 while receiving the reception signal of the second cellular communication.

According to various example embodiments, the fifth switch 1090 may include a first terminal 1091 connected to one side of the coupler 1089, a second terminal 1092 connected to the other side of the coupler 1089, a third terminal 1093 connected to the matching circuit 1096, a fourth terminal 1094 connected to the mismatching circuit 1097, and/or a fifth terminal 1095 connected to the transceiver 303. The communication processor 301 may control the fifth switch 1090 to connect the second terminal 1092 to the fourth terminal 1094 while receiving the reception signal of the first cellular communication so that the coupler 1089 is connected to the mismatching circuit 1097. The reception signal may be transmitted to the transceiver 303 through the third reception chain 1071 or the fourth reception chain 1075 without being separated by the coupler 1089 because the coupler 1089 is mismatched. Accordingly, the reception signal may reduce or prevent loss of the reception signal by the coupler 1019.

According to various example embodiments, the communication processor 301 may control the fifth switch 1090 to connect the first terminal 1091 to the third terminal 1093 so that the coupler 1089 is connected to the matching circuit 1096 while outputting the transmission signal of the first cellular communication. As the coupler 1089 is impedance matched, a part of the transmission signal may be separated by the coupler 1089. The part of the transmission signal separated by the coupler 1089 may be transmitted to the transceiver 303 through the fifth terminal 1095.

A communication circuit according to various example embodiments may include a transmission chain that outputs a transmission signal through an antenna; a reception chain that receives a reception signal through the antenna; a transceiver electrically connected to the transmission chain and/or the reception chain; a coupler that transmits a part of the transmission signal transmitted between the transmission chain and/or the reception chain and the antenna to the transceiver; and a switch electrically connected to the coupler, and the switch may connect the coupler to one circuit of a matching circuit for impedance matching of the coupler and a mismatching circuit for impedance mismatching of the coupler according to a time specified to output the transmission signal or a time specified to receive the reception signal.

In the communication circuit according to various example embodiments, the switch may be configured to electrically connect the matching circuit to the coupler for a specified time to output the transmission signal through the transmission chain.

In the communication circuit according to various example embodiments, the switch may be configured to electrically connect the mismatching circuit to the coupler for a specified time to receive the reception signal.

In the communication circuit according to various example embodiments, the mismatching circuit may be configured to increase the impedance of the coupler so that the strength of the reception signal separated by the coupler decreases.

In the communication circuit according to various example embodiments, the mismatching circuit may include a filter that blocks a frequency band of the reception signal.

In the communication circuit according to various example embodiments, the switch may include a first terminal connected to one side of the coupler; a second terminal connected to the other side of the coupler; a third terminal connected to the matching circuit; a fourth terminal connected to the mismatching circuit; and a fifth terminal connected to the transceiver, and the switch may be configured to connect the first terminal to the third terminal for a specified time to output the transmission signal through the first transmission chain, and connect the first terminal and the second terminal to the fourth terminal for a specified time to receive the reception signal through the first reception chain.

In the communication circuit according to various example embodiments, the mismatching circuit may include a plurality of filters corresponding to different frequency bands, and the switch may be configured to electrically connect a filter selected from among the plurality of filters to the coupler according to frequency bands of the transmission signal and the reception signal for a specified time to receive the reception signal.

A communication circuit according to various example embodiments may include a transmission chain that outputs a transmission signal of a first frequency band through an antenna; a reception chain that receives a reception signal of a second frequency band through the antenna; a transceiver electrically connected to the transmission chain and/or the reception chain; a coupler that transmits a part of the transmission signal transmitted between the transmission chain and/or the reception chain and the antenna to the transceiver; and a switch electrically connected to the coupler, and the switch may be configured to connect the coupler to one circuit of a matching circuit for impedance matching of the coupler and a mismatching circuit for impedance mismatching of the coupler according to transmitting the transmission signal or receiving the reception signal.

In the communication circuit according to various example embodiments, the switch may be configured to electrically connect the mismatching circuit to the coupler while receiving the reception signal.

In the communication circuit according to various example embodiments, the switch may be configured to electrically connect the matching circuit to the coupler while transmitting the transmission signal.

In the communication circuit according to various example embodiments, the mismatching circuit may be configured to increase the impedance of the coupler so that the strength of the reception signal separated by the coupler decreases.

In the communication circuit according to various example embodiments, the mismatching circuit may include a second filter that blocks a frequency band of the reception signal.

In the communication circuit according to various example embodiments, the switch may include a first terminal connected to one side of the coupler; a second terminal connected to the other side of the coupler; a third terminal connected to the matching circuit; a fourth terminal connected to the mismatching circuit; and a fifth terminal connected to the transceiver, and the switch may be configured to connect the first terminal to the third terminal while outputting the transmission signal through the transmission chain, and connect the first terminal and the second terminal to the fourth terminal while receiving the reception signal through the reception chain.

In the communication circuit according to various example embodiments, the communication circuit may further include a filter connected between the matching circuit, the mismatching circuit, and the coupler, and separating the signal of the first frequency band and the signal of the second frequency band.

An electronic device according to various example embodiments may include a communication processor; a communication circuit electrically connected to the communication processor, and a transmission chain that outputs a transmission signal through an antenna; a reception chain that receives a reception signal through the antenna; a transceiver electrically connected to the transmission chain and/or the reception chain; a coupler that transmits a part of the transmission signal transmitted between the transmission chain and/or the reception chain and the antenna to the transceiver; and a switch electrically connected to the coupler, and the communication processor may be configured to control the switch to connect the coupler to one circuit of a matching circuit for impedance matching of the coupler and a mismatching circuit for impedance mismatching of the coupler according to a time specified to output the transmission signal or a time specified to receive the reception signal.

In the electronic device according to various example embodiments, the communication processor may be configured to control the switch to electrically connect the matching circuit to the coupler for a specified time to output the transmission signal through the transmission chain.

In the electronic device according to various example embodiments, the communication processor may be configured to control the switch to electrically connect the mismatching circuit to the coupler for a specified time to receive the reception signal.

In the electronic device according to various example embodiments, the mismatching circuit may be configured to increase the impedance of the coupler so that the strength of the reception signal separated by the coupler decreases.

In the electronic device according to various example embodiments, the mismatching circuit may include a filter that blocks a frequency band of the reception signal.

In the electronic device according to various example embodiments, the switch may include a first terminal connected, directly or indirectly, to one side of the coupler; a second terminal connected, directly or indirectly, to the other side of the coupler; a third terminal connected, directly or indirectly, to the matching circuit; a fourth terminal connected, directly or indirectly, to the mismatching circuit; and a fifth terminal connected, directly or indirectly, to the transceiver, and the communication processor may be configured to control the switch to connect the first terminal to the third terminal for a specified time to output the transmission signal through the first transmission chain, and control the switch to connect the first terminal and the second terminal to the fourth terminal for a specified time to receive the reception signal through the first reception chain.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A communication circuit comprising:
a transmission chain configured to output a transmission signal via an antenna;
a reception chain configured to receive a reception signal via the antenna;
a transceiver electrically connected to the transmission chain and/or the reception chain;
a coupler configured to transmit at least a part of the transmission signal transmitted between the transmission chain and/or the reception chain and the antenna to the transceiver; and
a switch electrically connected to the coupler, wherein the switch comprises:
a first terminal connected to a transceiver side of the coupler;
a second terminal connected to an antenna side of the coupler;
a third terminal connected to the matching circuit;
a fourth terminal connected to the mismatching circuit; and
a fifth terminal connected to the transceiver, and
wherein the switch is configured to:
connect the first terminal to the third terminal for a specified time to output the transmission signal via the first transmission chain and thereby connect the coupler and the matching circuit for impedance matching of the coupler and the matching circuit during the specified time to output the transmission signal via the transmission chain, and
connect the first terminal and the second terminal to the fourth terminal for a specified time to receive the reception signal via the first reception chain and thereby connect the coupler and the mismatching circuit for impedance mismatching of the coupler and the mismatching circuit during the specified time to receive the reception signal via the reception chain.

2. The communication circuit of claim 1, wherein the mismatching circuit is configured to increase the impedance of the coupler so that the strength of the reception signal separated by the coupler decreases.

3. The communication circuit of claim 1, wherein the mismatching circuit comprises a filter configured to block a frequency band of the reception signal.

4. The communication circuit of claim 1, wherein the mismatching circuit comprises a plurality of filters corresponding to different frequency bands, and wherein the switch is configured to electrically connect a filter selected from among the plurality of filters to the coupler based on frequency bands of the transmission signal and the reception signal for a specified time to receive the reception signal.

5. A communication circuit comprising:

a transmission chain configured to output a transmission signal of a first frequency band via an antenna;

a reception chain configured to receive a reception signal of a second frequency band via the antenna;

a transceiver electrically connected to the transmission chain and/or the reception chain;

a coupler configured to transmit a part of the transmission signal transmitted between the transmission chain and/ or the reception chain and the antenna to the transceiver; and a switch electrically connected to the coupler, wherein the switch comprises:

a first terminal connected to a transceiver side of the coupler;

a second terminal connected to an antenna side of the coupler;

a third terminal connected to the matching circuit;

a fourth terminal connected to the mismatching circuit; and a fifth terminal connected to the transceiver, and wherein the switch is configured to:

connect the first terminal to the third terminal for a specified time to output the transmission signal via the first transmission chain and thereby connect the coupler and the matching circuit for impedance matching of the coupler and the matching circuit during the specified time to output the transmission signal via the transmission chain, and connect the first terminal and the second terminal to the fourth terminal for a specified time to receive the reception signal via the first reception chain and thereby connect the coupler and the mismatching circuit for impedance mismatching of the coupler and the mismatching circuit during the specified time to receive the reception signal via the reception chain.

6. The communication circuit of claim 5, wherein the mismatching circuit is configured to increase the impedance of the coupler so that the strength of the reception signal separated by the coupler decreases.

7. The communication circuit of claim 5, wherein the mismatching circuit comprises a second filter configured to substantially block a frequency band of the reception signal.

8. The communication circuit of claim 5, wherein the communication circuit further comprises a filter connected between at least the matching circuit, the mismatching circuit, and the coupler, and separating the signal of the first frequency band and the signal of the second frequency band.

9. An electronic device comprising:

memory storing instructions;

at least one processor comprising processor circuitry;

a communication circuit electrically connected to the at least one processor, a transmission chain configured to output a transmission signal through an antenna;

a reception chain configured to receive a reception signal through the antenna;

a transceiver electrically connected to the transmission chain and/or the reception chain;

a coupler configured to transmit a part of the transmission signal transmitted between the transmission chain and/ or the reception chain and the antenna to the transceiver; and a switch electrically connected to the coupler, wherein the switch comprises;

a first terminal connected to a transceiver side of the coupler;

a second terminal connected to an antenna side of the coupler;

a third terminal connected to the matching circuit;

a fourth terminal connected to the mismatching circuit; and a fifth terminal connected to the transceiver, and wherein the instructions, when executed by the at least one processor, individually and/or collectively, cause the electronic device to:

control the switch to connect the first terminal to the third terminal for a specified time to output the transmission signal via the first transmission chain and thereby connect the coupler and the matching circuit for impedance matching of the coupler and the matching circuit during the specified time to output the transmission signal via the transmission chain, and control the switch to connect the first terminal and the second terminal to the fourth terminal for a specified time to receive the reception signal via the first reception chain and thereby connect the coupler and the mismatching circuit for impedance mismatching of the coupler and the mismatching circuit during the specified time to receive the reception signal via the reception chain.

\* \* \* \* \*